United States Patent
Olsson et al.

(10) Patent No.: US 11,029,439 B1
(45) Date of Patent: *Jun. 8, 2021

(54) UTILITY LOCATOR APPARATUS, SYSTEMS, AND METHODS

(71) Applicant: SeeScan, Inc., San Diego, CA (US)

(72) Inventors: Mark S. Olsson, La Jolla, CA (US); Michael J. Martin, San Diego, CA (US); Ray Merewether, La Jolla, CA (US); Paul G. Stuart, Lemon Grove, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,486

(22) Filed: Apr. 16, 2018

Related U.S. Application Data

(63) Continuation of application No. 14/321,699, filed on Jul. 1, 2014, now Pat. No. 9,945,976, which is a continuation of application No. 13/108,916, filed on May 16, 2011, now Pat. No. 8,773,133, which is a continuation of application No. 12/785,826, filed on May 24, 2010, now Pat. No. 7,948,236, which is a continuation of application No. 11/854,694, filed on Sep. 13, 2007, now Pat. No. 7,741,848.

(60) Provisional application No. 60/826,064, filed on Sep. 18, 2006.

(51) Int. Cl.
*G01R 3/00* (2006.01)
*G01V 3/15* (2006.01)
*G01V 3/10* (2006.01)
*G01V 3/08* (2006.01)
*G01V 3/16* (2006.01)

(52) U.S. Cl.
CPC .............. *G01V 3/15* (2013.01); *G01V 3/08* (2013.01); *G01V 3/081* (2013.01); *G01V 3/10* (2013.01); *G01V 3/101* (2013.01); *G01V 3/102* (2013.01); *G01V 3/104* (2013.01); *G01V 3/105* (2013.01); *G01V 3/107* (2013.01); *G01V 3/16* (2013.01)

(58) Field of Classification Search
CPC .................................. G01V 3/15; G01V 3/08
See application file for complete search history.

(56) References Cited

U.S. PATENT DOCUMENTS

| | | | |
|---|---|---|---|
| 5,828,589 A | 10/1998 | Degenhardt | |
| 7,009,399 B2 | 3/2006 | Olsson et al. | |
| 7,095,231 B2 | 8/2006 | Thompson et al. | |
| 7,136,765 B2 | 11/2006 | Maier et al. | |
| 7,197,522 B2 | 3/2007 | Mallinson | |
| 7,310,584 B2 | 12/2007 | Royle | |
| 7,741,848 B1* | 6/2010 | Olsson | G01V 3/15 324/326 |
| 9,945,976 B2* | 4/2018 | Olsson | G01V 3/15 |
| 2004/0178795 A1* | 9/2004 | Thompson | G01V 15/00 324/326 |

* cited by examiner

*Primary Examiner* — Reena Aurora
(74) *Attorney, Agent, or Firm* — Steven C. Tietsworth, Esq.

(57) ABSTRACT

Man-portable locator systems for locating buried or otherwise inaccessible pipes, conduits, cables, wires, and/or inserted transmitters using magnetic field antenna arrays and signal processing to analyze and display information about multiple buried utilities simultaneously are disclosed.

16 Claims, 27 Drawing Sheets

UTILITY LOCATOR APPARATUS, SYSTEMS, AND METHODS

CROSS-REFERENCE TO RELATED APPLICATIONS

This application is a continuation of and claims priority to co-pending U.S. Utility patent application Ser. No. 14/321,699, entitled UTILITY LOCATOR APPARATUS, SYSTEMS, AND METHODS, filed Jul. 1, 2014, which is a continuation of and claims priority to U.S. Utility patent application Ser. No. 13/108,916, now U.S. Pat. No. 8,773,133, entitled ADAPTIVE MULTICHANNEL LOCATOR SYSTEM FOR MULTIPLE PROXIMITY DETECTION, filed May 16, 2011, which is a continuation of and claims priority to U.S. Utility patent application Ser. No. 12/785,826, now U.S. Pat. No. 7,948,236, entitled ADAPTIVE MULTICHANNEL LOCATOR SYSTEM FOR MULTIPLE PROXIMITY DETECTION, filed May 24, 2010, which is a continuation of and claims priority to U.S. Utility patent application Ser. No. 11/854,694, now U.S. Pat. No. 7,741,848, entitled ADAPTIVE MULTICHANNEL LOCATOR SYSTEM FOR MULTIPLE PROXIMITY DETECTION, filed Sep. 13, 2007 which claims priority under 35 U.S.C. § 119(e) to U.S. Provisional Patent Application Ser. No. 60/826,064, filed Sep. 18, 2006, entitled MULTICHANNEL LOCATOR WITH MULTIPLE PROXIMITY DETECTION. This application claims priority to each of the above-described applications. The content of each of the above-described applications is incorporated by reference herein in its entirety for all purposes.

FIELD

This disclosure relates generally to electronic systems and methods for locating buried or otherwise inaccessible pipes and other conduits, cables, conductors and self-contained transmitters. More specifically, but not exclusively, the disclosure relates to portable locators for operation in a multiple signal environment.

BACKGROUND

There are many situations where is it desirable to locate buried utilities such as pipes and cables. For example, before starting any new construction involving excavation, it is important to locate existing underground utilities such as underground power-lines, gas lines, phone lines, fiber optic cable conduits, CATV cables, sprinkler control wiring, water pipes, sewer pipes, etc., collectively and individually referred to hereinafter as "utilities" or "objects." As used herein the term "buried" refers not only to objects below the surface of the ground, but in addition, to objects located inside walls, between floors in multi-story buildings or cast into concrete slabs, etc. If a backhoe or other excavation equipment hits a high voltage line or a gas line, serious injury and property damage may result. Severing water mains and sewer lines leads to messy cleanups. The destruction of power and data lines may seriously disrupt the comfort and convenience of residents and cost businesses huge financial losses.

Buried objects may be located, for example, by sensing an alternating current (AC) electromagnetic signal emitted by the same. Some cables such as power-lines are already energized and emit their own long cylindrical electromagnetic field. Location of other conductive lines may be facilitated by energizing the line sought with an outside electrical source having a frequency typically in the region of approximately 50 Hz to 500 kHz. Location of buried long conductors is often referred to in the art as "line tracing," a term that is so used herein.

A "sonde" (also referenced in the art as a "transmitter," "beacon" or "duct probe," for example) is a term used herein to denominate a signal transmitter apparatus that typically includes a coil of wire wrapped around a ferromagnetic core. The coil is energized with a standard electrical source at a desired frequency, typically in the frequency region of approximately 50 Hz to 500 kHz. The sonde may be attached to a push cable or line or it may be self-contained so that it may be flushed through a pipe with water. A sonde typically generates a dipole electromagnetic field, which is more complex than the long cylindrical pattern produced by an energized line. However, a sonde may be localized to a single point. A typical low frequency sonde does not strongly couple to other objects and thereby avoids the production of complex interfering field patterns that may occur during the tracing. The term "buried objects" is used herein in a general sense and includes, for example, sondes and buried locatable markers such as marker balls.

When locating buried objects before excavation, it is also very desirable to determine the depth of the buried objects. This may be done by measuring the difference in field strength at two locations. Although various methods of determining depth of buried conductors are well-established in the art, it is also well-known that existing methods may produce variable and therefore unreliable results leading to potentially dangerous errors in depth estimation when operating in the presence of complex or distorted electromagnetic fields.

Portable locators that heretofore have been developed offer limited functionality insufficient for quickly and accurately locating buried utilities. Accordingly, there is still a clearly-felt need in the art for an improved compact man-portable locator system with user interface (UI) features permitting the locator operator to quickly and accurately manage the simultaneous detection and localization of a plurality of buried and/or inaccessible targets. Accordingly, there is a need in the art to address the above-described as well as other problems.

SUMMARY

This disclosure relates generally to electronic systems and methods for locating buried or otherwise inaccessible pipes and other conduits, cables, conductors and self-contained transmitters. More specifically, but not exclusively, the disclosure relates to portable locators for operation in a multiple signal environment.

In one aspect, this disclosure relates to a system for simultaneously searching and analyzing multiple frequency bands, and sorting the resultant target detections according to their proximity to the locator instrument for presentation to the operator by means of a user interface (UI) system, which may include a multi-layered display of real-time or near-real-time target analysis information.

The UI system may operate to simultaneously filter and process outputs from multiple detection channels in a manner that improves locator operator effectiveness. Embodiments may also be adapted to seek objects of interest by dynamically forming and revising signal filters to focus locator assets on the particular objects found within detection range.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Figure 1A:
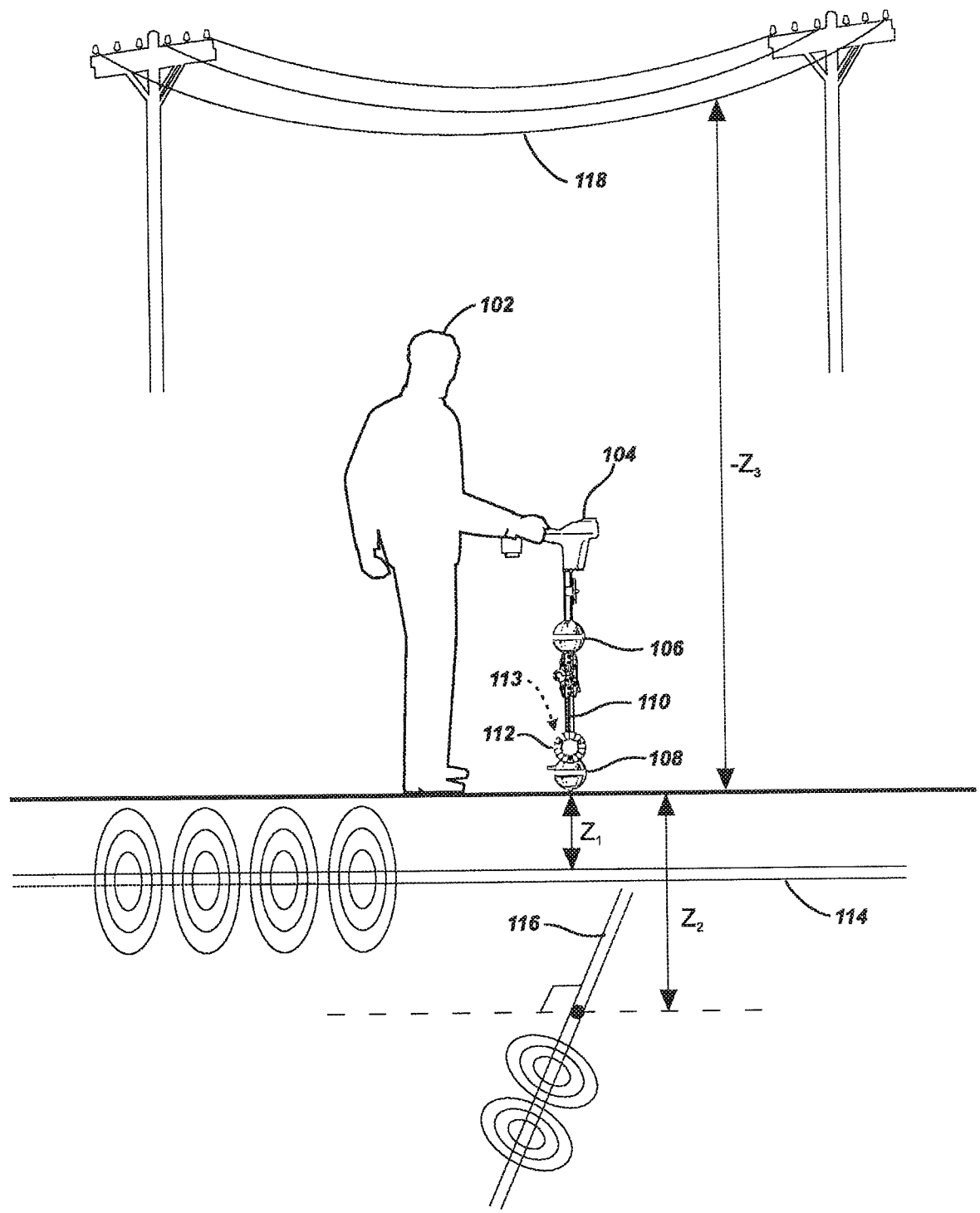
FIG. 1A is a general view of an exemplary multiple electromagnetic field source environment suitable for use of the locator system embodiments as described herein.

This application is related by common inventorship and subject matter to the commonly-assigned patent application Ser. No. 10/268,641 entitled "Omnidirectional Sonde and Line Locator" filed on Oct. 15, 2002 by Mark Olsson et al. and published on Apr. 15, 2004 as U.S. Patent Application No. 2004/0070399A1, and to the commonly-assigned patent application Ser. No. 10/308,752 entitled "Single and Multi-Trace Omnidirectional Sonde and Line Locators and Transmitter Used Therewith" filed on Dec. 3, 2002 by Mark Olsson et al. and published on Apr. 15, 2004 as U.S. Patent Application No. 2004/0070535A1, which are both entirely incorporated herein by this reference. This application is also related by common inventorship and subject matter to the commonly-assigned patent application Ser. No. 10/956,328 entitled "Multi-Sensor Mapping Omnidirectional Sonde and Line Locators" filed on Oct. 1, 2004, patent application Ser. No. 11/106,894 entitled "Locator with Apparent Depth Indication" filed on Apr. 15, 2005, patent application Ser. No. 11/184,456 entitled "A Compact Self-Tuned Electrical Resonator for Buried Object Locator Applications" filed on Jul. 19, 2005, and patent application Ser. No. 11/248,539 entitled "A Reconfigurable Portable Locator Employing Multiple Sensor Arrays Having Flexible Nested Orthogonal Antennas" filed on Oct. 12, 2005, which are all entirely incorporated herein by this reference. This application is also related by common inventorship and subject matter to the Provisional Patent Application No. 60/806,708, filed on Jul. 6, 2006, and entitled, "Mesh Networked Wireless Buried Pipe and Cable Locating System," as well as to U.S. Pat. No. 7,136,765, issued on Nov. 14, 2006, entitled "Buried Object Locating and Tracing Method and System Employing Principal Components Analysis for Blind Signal Detection" (Maier, et al.), both of which are entirely incorporated herein by this reference.

Embodiments of the invention described herein provide an unexpectedly advantageous cable, pipe and sonde location method and apparatus by using a streamed concatenation of a plurality of detector data channels; for example, by using vector-summation and Fast Fourier Transform (FFT) or similar techniques. Such data streams are made useable for the first time by introducing an advantageous user interface (UI) for presenting to the operator (also denominated "user" herein) information representing multiple objects, frequencies and changes in the subterranean landscape simultaneously using graphical, numeric, and acoustic representations.

By using advantageous combinations of correlations, proximity calculations, vector calculations and adaptive filtering, this locator system facilitates the limiting of operator attention to signals of interest selected automatically from among a larger set of signal detections at a particular location. For example, the signals of interest may be selected according to the estimated proximity of the sources of detected signals. The locator system preferably includes some means for converting antennas and coil analog signal input to digital data, some means for storing the digital data and for performing calculations therewith, and some means for displaying results from such calculations to an operator, including graphical images, for example. The simultaneous analysis and display of source detections at multiple frequencies, and the adaptive filtering described herein below, operate to enhance operator utility in complex signal environments.

In general, the exemplary embodiments described herein are intended to be useful examples of the system of this invention and are not intended to be limited to any particular embodiment of the method of this invention, nor to any particular number or orientation of antenna arrays, for example. One versed in the art may readily appreciate that the system and method of this invention may be readily adapted for use with many other useful antenna configurations and/or calculation methods, as is evident from the following discussion.

FIG. 1A is a general view of an operator 102 and a locator system embodiment 104 working in an exemplary multiple electromagnetic field source environment. Operator 102 holds locator 104, which is equipped with upper and lower omnidirectional antenna nodes 106 and 108 affixed to a central shaft 110. Locator 104 is also equipped with right and left gradient-coil antennas 112 and 113 (antenna 113 is hidden), which, in this example, are affixed above lower omnidirectional antenna node 108 and extend to the operator's right and left from central shaft 110. An underground utility line 114 is disposed at a depth $Z_1$ below locator 104 and a second buried utility line 116 is disposed at a depth $Z_2$ below locator 104. An overhead electromagnetic (EM) signal source 118 is shown embodied as overhead power lines, which are disposed at a distance $Z_3$ above the bottom of lower antenna node 108. As may be readily appreciated, each of utility lines 114, 116, and 118 is separated from lower antenna node 108 by a different proximity value, $Z_1$, $Z_2$, and $Z_3$. As discussed in more detail below, it is an important feature of the locator system of this invention that these differing signal proximities and frequency spectra are employed to spatially separate and identify the discrete signal sources.

The user (also denominated "operator" herein) of locator system 104 cannot change the underlying conditions of a difficult location environment, but the user can improve the location results from locator 104 by, for example, changing the frequency, grounding conditions, and transmitter location or by isolating the target line from a common ground, for example, by making a better ground connection, avoiding signal splits, or taking steps to reduce local magnetic field (B-field) distortion.

Figure 1B:
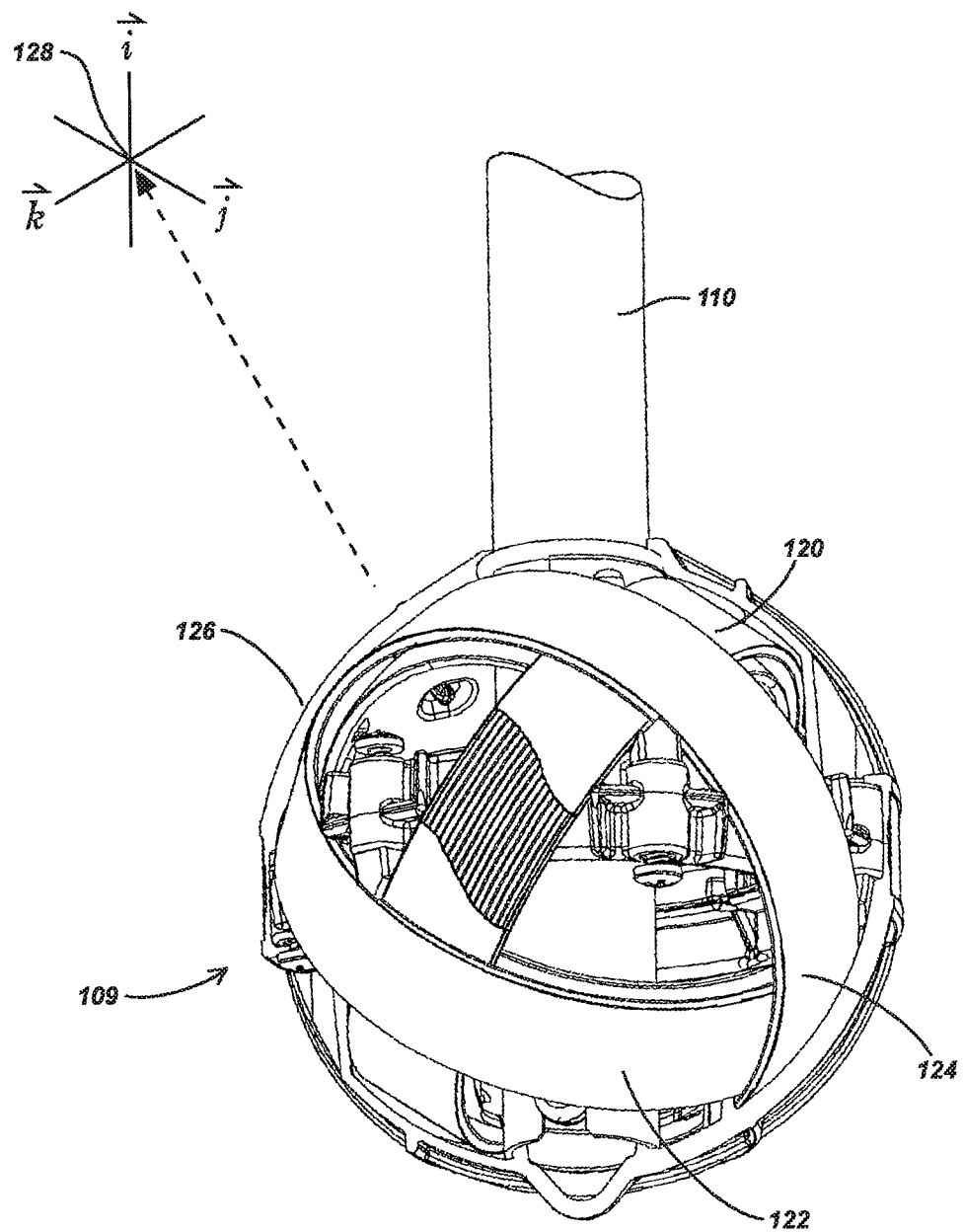
FIG. 1B is a breakaway view of a lower three-dimensional (3D) sensor array embodiment suitable for use in the sensor assembly of the locator system of FIG. 1A.

FIG. 1B is a breakaway view of the three-dimensional omnidirectional sensor array 109 contained within lower antenna node 108 (FIG. 1A), and is exemplary of the internal structure of the sensor arrays within other nodes. Array 109 includes three orthogonally-aligned antenna windings 120, 122, and 124 fixed within a rigid casing 126. Windings 120, 122, and 124 are thereby disposed to define the three orthogonal sensor axes 128-$i$, 128-$j$, and 128-$k$ having a fixed orientation with respect to central shaft 110.

Figure 1C:
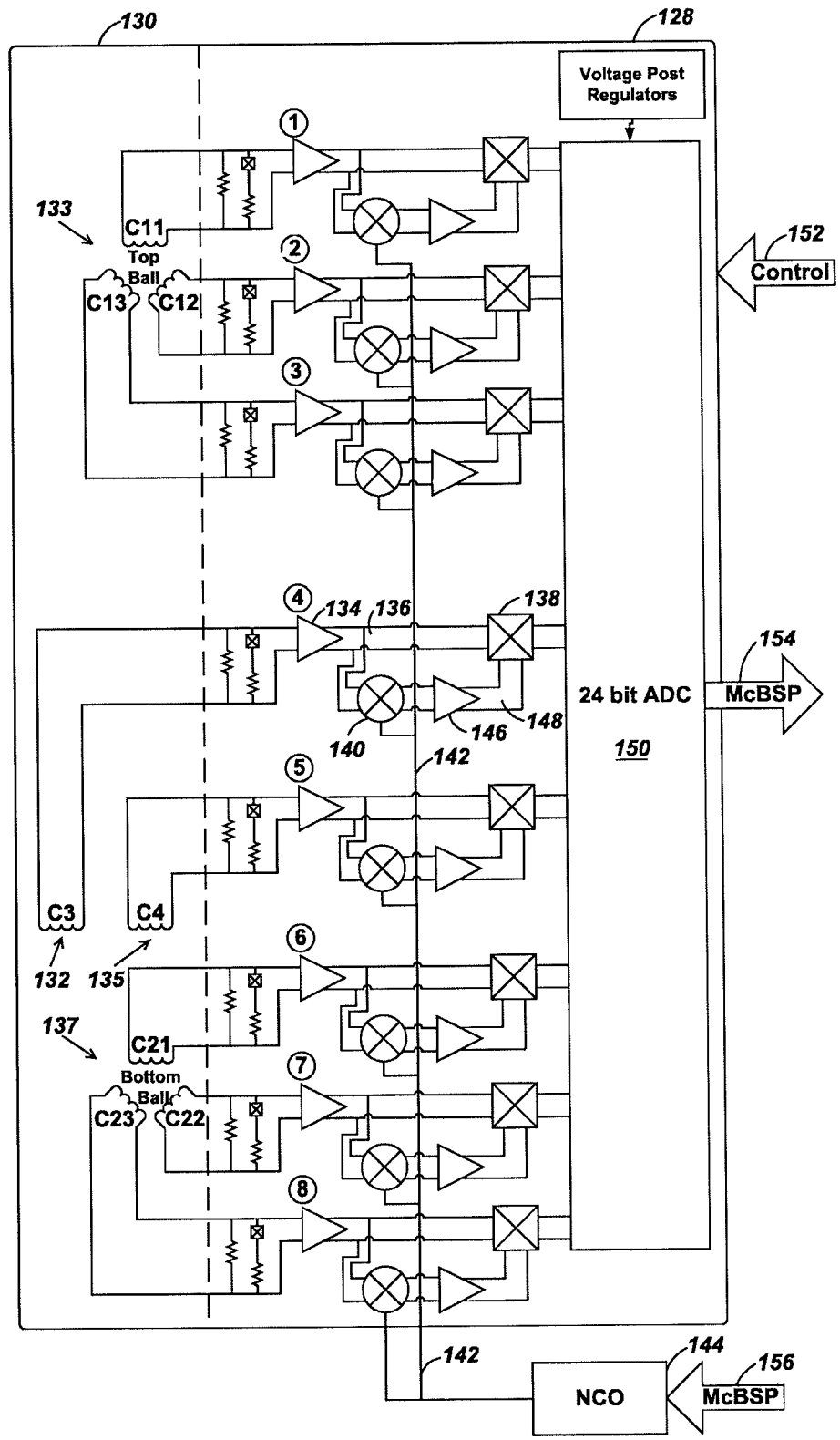
FIG. 1C is a block diagram illustrating an embodiment of the sensor and sensor conditioning assemblies suitable for use with the locator system of FIG. 1A.

FIG. 1C is a block diagram illustrating an 8-sensor signal-conditioning assembly embodiment 128 suitable for use in locator system 104. A sensor assembly 130 includes eight identical EM field sensor coils (like winding 120 in FIG. 1B) organized physically into three orthogonal sensor coils (C11, C12, C13) constituting a Top Ball (upper) array 133 (like upper three-dimensional (3D) sensor array 106), three orthogonal sensor coils (C21, C22, C23) constituting a Bottom Ball (lower) array 137 (like lower 3D sensor array 108), and two sensor coils (C3, C4) constituting the horizontal gradient sensor assemblies 132 and 135 (like antennas 112 and 113 in FIG. 1A). Each coil (C11, C12, C13, C21, C22, C23, C3, and C4) is independently coupled to one of eight identical channels in the analog signal conditioning and digitizing assembly 128, each of which may be appreciated with reference to the following description of the fourth conditioning channel coupled to EM field sensor 132 (C3). Coil C3 is coupled by way of the appropriate frequency-response conditioning and signal attenuating elements to a preamplifier 134, which produces a low-impedance differential analog time-varying signal S4($t$) 136. Signal S4($t$) 136 is routed directly to the switch 138 and also to the mixer 140 where it is mixed with a local oscillator (LO) signal 142 from a numerically-controlled oscillator (NCO) 144 governed by clock-control signal 156 to produce the usual sum and difference frequencies, which may be lowpass filtered in the usual manner to remove the sum frequencies from the difference frequencies at the input of the isolation amplifier 146, for example. Thus, amplifier 146 produces an intermediate frequency (IF) signal 148 representing time-varying signal S4(t) 136 shifted up or down in frequency by an amount corresponding to LO signal 142.

Switch 138 may be set to present either time-varying signal S4(t) 136 or IF signal 148 or both to the 24-bit Analog-to-Digital Converter (ADC) assembly 150, which produces a digital data signal representing a sample of the selected analog time-varying signals (either signal 136 or signal 148) in the usual manner. Signal S4(t) 136 may be preferred when the signal frequency of interest is within a range of values that may be sampled by the ADC; and signal 148 may be preferred when the signal frequency of interest is higher than the range of values that may be sampled by the ADC, for example.

Responsive to the external control signals 152, ADC assembly 150 thereby produces K=8 streams of digital signal samples representing the K=8 time-varying signals $\{S_k(t)\}$ from sensor assembly 130. These signals are transmitted via, for example, a Texas Instruments Multi-Channel Buffered Serial Port (McBSP)™ 154. ADC assembly 150 provides a new signal sample for each of K=8 sensor signals for every t-second interval, which is herein denominated the sampling interval. For example, the inventors have demonstrated the usefulness of a 73,245 Hz sampling rate, which imposes a sampling interval T=13.65 microseconds. This data may optionally be stored, transmitted, or displayed to the operator by way of some aspect of the User Interface (UI). Any known storage, transmission, or display means may be used. One or more filters may then optionally be matched to any desirable range of available frequencies as indicated by those frequency bins with the highest signal energy values, to maximize the transmittance of the signal of a given detected utility. These filters might be chosen from a pre-calculated set of possible filters, or determined analytically and subsequently formed by software. By way of example, one filter might be chosen (or adaptively formed) to maximize the transmittance of certain lower frequency power-line signal components, and another filter might be chosen (or adaptively formed) to maximize the transmittance of certain higher frequency signal components. This adaptive process may operate continuously in the background or may be initiated by a user command, for example. It is apparent to one skilled in the art that alternative embodiments may be described according to the system of this invention wherein the function of any McBSP is performed by some other useful high-speed serial link, serial port interface (SPI), low-voltage differential signaling (LVDS) element, or the like.

Figure 1D:
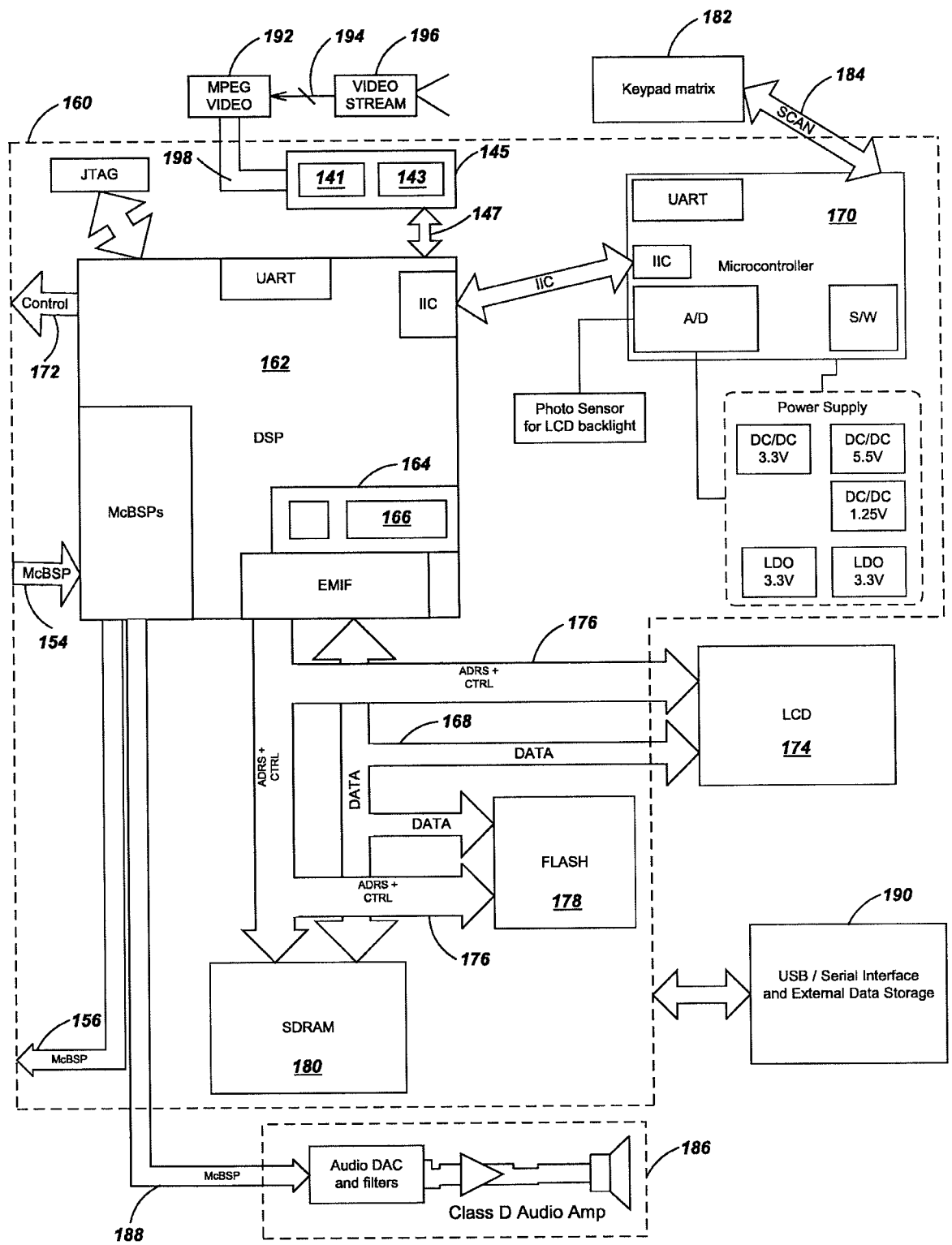
FIG. 1D is a block diagram illustrating an embodiment of the processor and user interface (UI) circuit assemblies suitable for use with the locator system of FIG. 1A.

FIG. 1D is a block diagram illustrating a processor circuit assembly embodiment 160, including a user interface (UI) circuit assembly embodiment of this invention. The processor assembly 160 accepts digital signal samples 154 from ADC assembly 150 (FIG. 1C) at a digital signal processor (DSP) 162, which includes internal memory 164 for storing and executing the accumulator and evaluator software program elements 166 required to produce digital data representing buried object emission field vectors on the data bus 168 in any useful manner described in the above-cited commonly-assigned patent applications fully incorporated herein by reference. For example, software program elements may be provided in DSP 162 to evaluate a B-field vector magnitude for each of the K=8 channels of digital data 154 arriving from analog signal conditioning and digitizing assembly 128. Indications of the 3D field vector BU(x, y, z) at the upper array node 106 (FIG. 1A) and indications of the 3D field vector BL(x, y, z) at the lower array node 108 may, under control of DSP 162, then be presented to the user by means of a UI assembly that comprises the liquid crystal display (LCD) 174, the audio interface 186, the keypad 182 and various associated memory chips and data buses in the example shown, for example. Additionally, indications of the independently measured horizontal magnetic gradient equal to the difference between the horizontal B-field component B1(x) at the centroid of coil (C3) 132 (like left gradient-coil sensor 113 in FIG. 1A) and the horizontal B-field component B2(x) at the centroid of coil (C4) 135 (like the right gradient-coil sensor 112 in FIG. 1A) may also be presented to the user by means of the UI assembly under control of DSP 162, for example. Moreover, these B-field vector indications may be limited to certain frequency bands and may be updated with the passage of time to reflect changes in any useful manner described in the above-cited fully-incorporated patent applications, for example.

DSP 162 operates under the control of a microcontroller 170 and also produces external control signals 172 for controlling ADC assembly 150 and the clock control signals transmitted by means of the Multi-Channel Buffered Serial Port 156 for controlling NCO 144 (FIG. 1C). The Graphical UI (GUI) LCD 174 is disposed to accept and display images and data representing buried object emission field vectors from data bus 168 under the control of various specifications transferred on the address and control bus 176. Data bus 168 and control bus 176 are also coupled to a flash memory 178 and a synchronous dynamic random-access memory (SDRAM) 180, which all operate under the control of DSP 162 and serve to store data for program control and display purposes, for example. The keypad matrix or other user input device 182 is coupled to microcontroller 170 by, for example, a standard matrix scan bus 184, whereby a user may insert commands to processor assembly 160. An Audio user interface (AUI) 186 operates to transfer various audio signals to a user from the serial bus 188 under the control of DSP 162. Processor assembly 160 may provide a new set of field vectors for every accumulation interval, which is herein defined as a plurality $N_T$ of the t-second sampling intervals $T_1 \ldots n$, thereby providing continuing indications as a function of time. This plurality $N_T$ of the t-second sampling intervals is indexed by the integer i=1, N, where N may vary from one accumulation interval to the next and where sequential accumulation intervals may be either disjoint or overlapping, for example. The t-second sampling interval may also vary. The inventors have demonstrated the usefulness of a T=64 sample buffer interval, for example. An external data interface module 190 is also provided to allow data communication between processor assembly 160 and external devices such as a personal computer or external storage devices such as external removable memory media or a universal serial bus (USB) drive (not shown), for example.

Figure 1E:
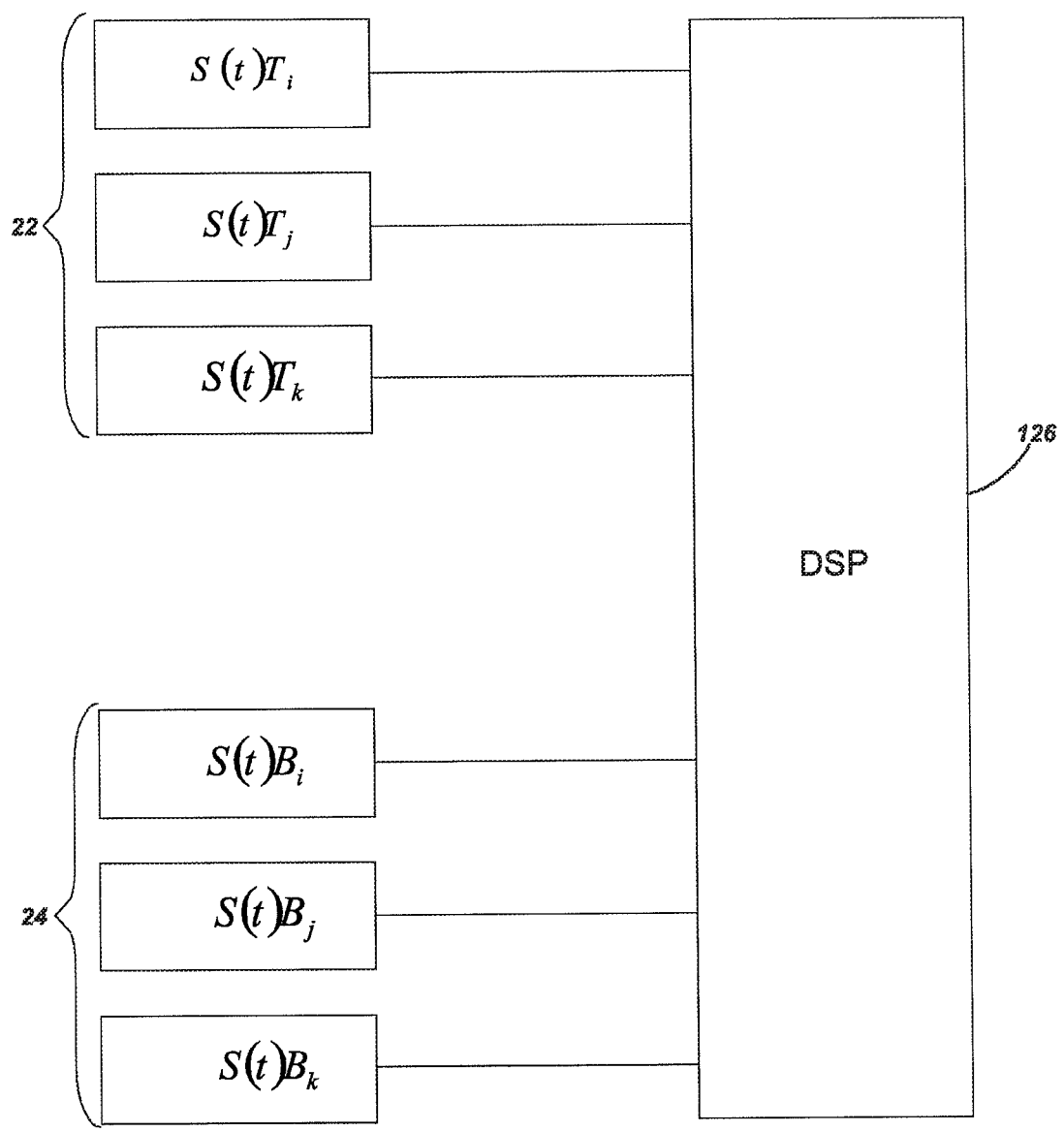
FIG. 1E is a block diagram illustrating an embodiment of an assembly for integrating multiple sensor inputs from the upper and lower omnidirectional sensors for transfer to a digital signal processing block suitable for use with the locator system of FIG. 1A.

FIG. 1E is a schematic showing the several inputs from multiple sensors as they relate to the DSP 162. The three orthogonal Top Ball signals $T_i$, $T_j$, and $T_k$ from top (upper) signal array 133 (FIG. 1C) are routed to the DSP 162, as are the three orthogonal Bottom Ball signals $B_i$, $B_j$, and $B_k$ from lower signal array 137 (FIG. 1C).

Figure 1F:
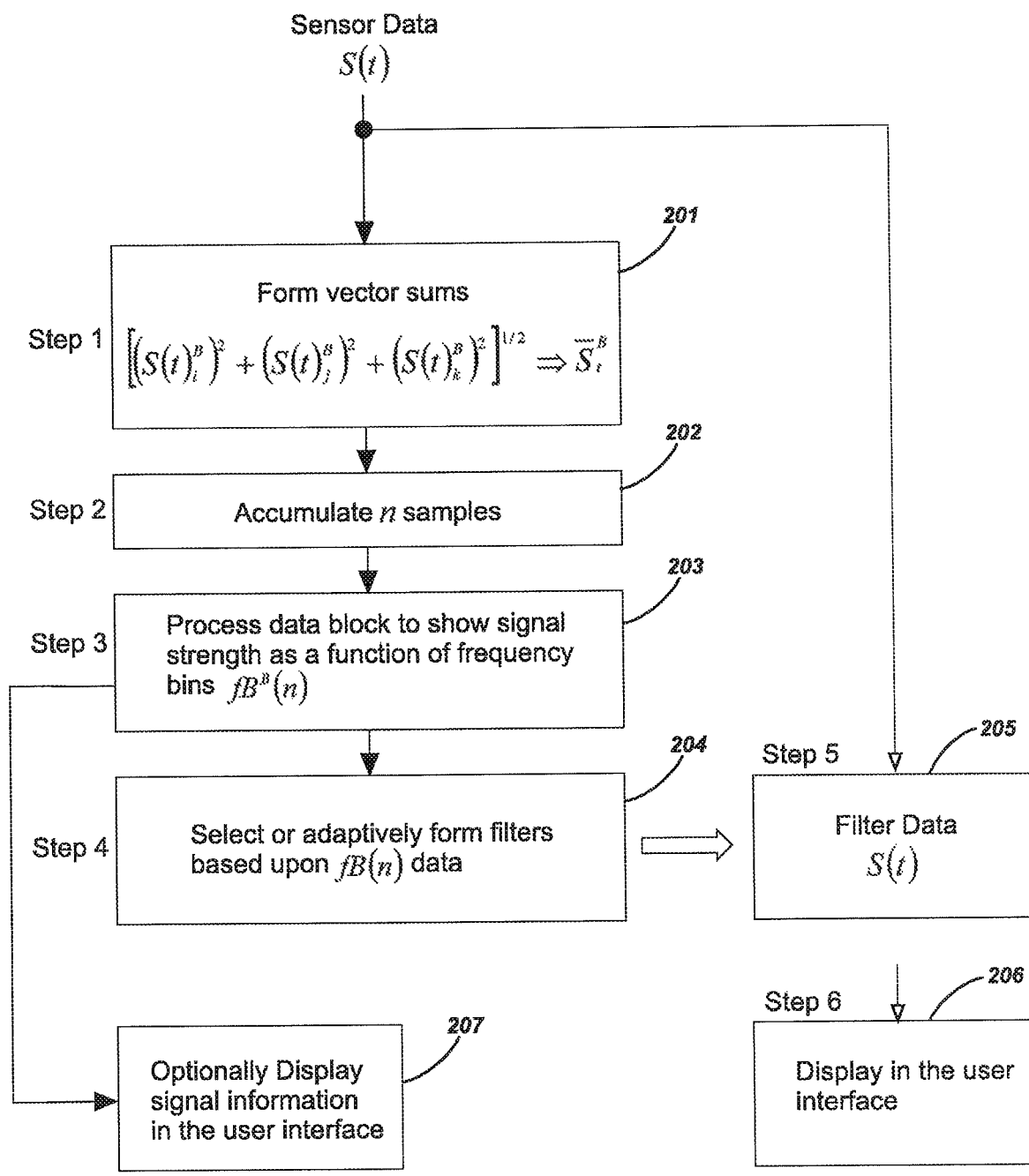
FIG. 1F is a flowchart illustrating an exemplary embodiment of a signal processing method suitable for use with the locator system of FIG. 1A, including steps of accumulating samples formed into vector sums, processing the accumulated signals responsive to signal amplitude as a function of the number n of frequency bins, and filtering the accumulated signals with respect to the frequency bins.

Turning now to the flow chart shown in FIG. 1F, according to one aspect, the method of this invention combines (as a vector sum) three or more channels of digital data from a detector array (for measuring the total field) into a single digital data stream representative of the total signal magnitude measured by the detector array. A transform process or power spectrum estimation technique performed on a vector or block of this data produces signal energy data as a function of frequency allocated to some number of predetermined frequency bins. In FIG. 1F, it is shown in Step 201 that sensor data is combined to form vector sums, in this example for lower-antenna array values i, j, and k. In Step 202, n samples of the processed values are collected in a data block. In Step 203, the data block is processed to show the collected signal-strength values in terms of n frequency bins, which may be sent for display on the UI at step 207. From this arrangement, the system selects filters from a preformed set or adaptively forms filters in Step 204, based on fB(n). The filtered data may be combined with direct data from the sensor array as shown in Step 205. Finally in step 206, the resultant data is sent for display on the UI.

According to another aspect, a method of this invention combines (as a vector sum) three or more channels of digital data from a detector array (for measuring the total field) into a single digital data stream representative of the total signal magnitude measured by the detector array. A Fast Fourier Transform (FFT) or similar technique is performed on a vector or block of these data. The result represents signal energy as a function of frequency allocated to some number of predetermined frequency bins. By way of example, a sample rate of 73,245 samples per second (corresponding to a Nyquist frequency of 36,622.5 Hz) might be allocated into a 2048 element channel data vector to yield a frequency bin size of 35.76 Hz. This frequency bin data may optionally be stored, transmitted, or displayed to the operator by way of some aspect of the UI. Any known storage, transmission, or display means may be used. One or more filters may then optionally be matched to any desirable range of available frequencies as indicated by those frequency bins with the highest signal energy values, to maximize the transmittance of the signal of a given detected utility. These filters might be chosen from a pre-calculated set of possible filters, or determined analytically and subsequently formed by software. By way of example, one filter might be chosen (or adaptively formed) to maximize the transmittance of certain lower frequency power-line signal components, and another filter might be chosen (or adaptively formed) to maximize the transmittance of certain higher frequency signal components. This adaptive process may operate continuously in the background or may be initiated by a user command, for example. It should be appreciated that the number n of samples in a buffer does not necessarily define the number of frequency bins into which the same samples are processed, although the two merely happen to be identical in FIG. 1F.

Figure 1G:
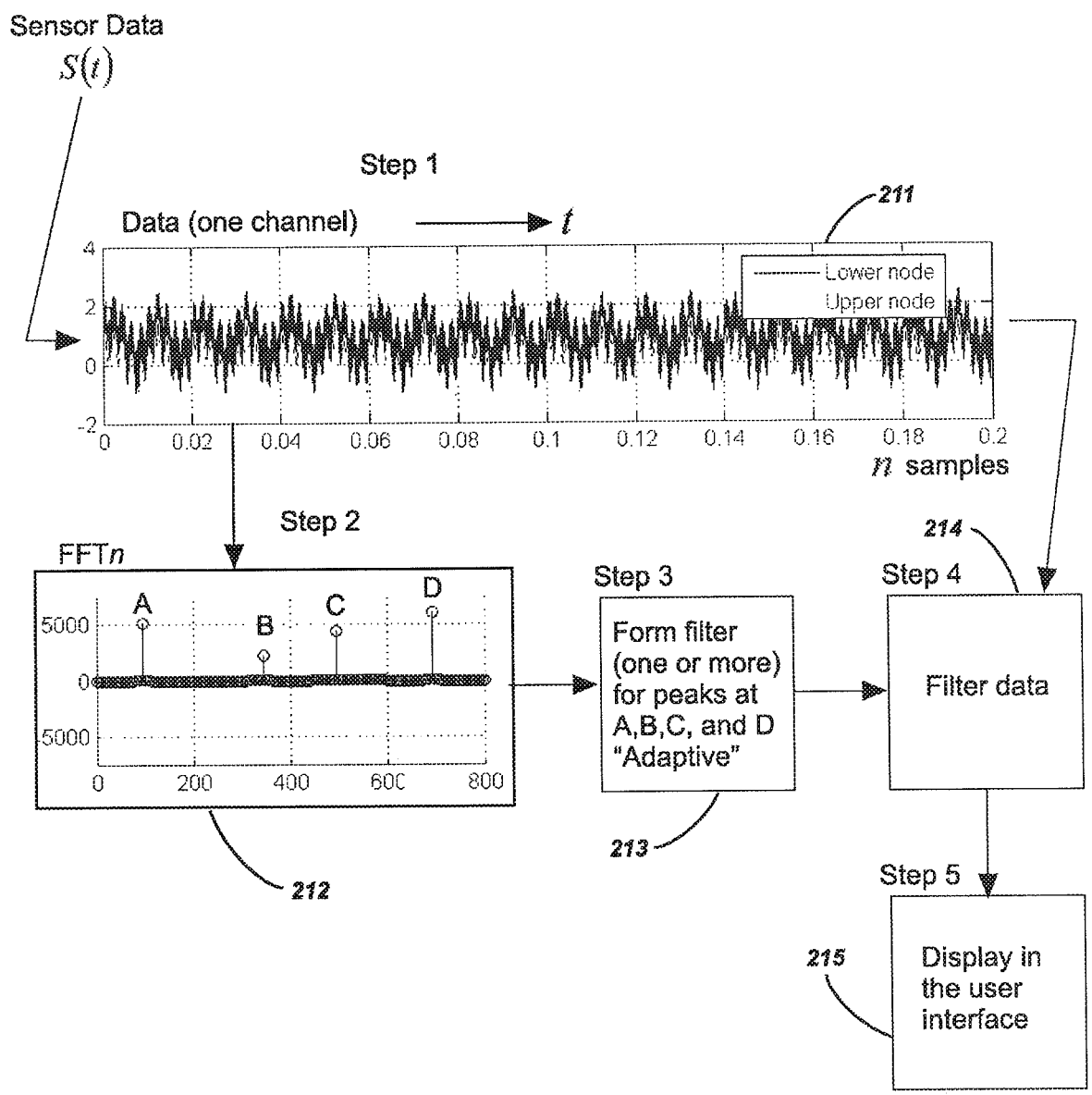
FIG. 1G is a flowchart illustrating an exemplary process suitable for use with the method of FIG. 1F when applied to data from one channel, including the steps of sampling signal data, processing the samples by means of Fourier transforms, and adaptively filtering the transform results.

FIG. 1G illustrates exemplary channel signal data (S(t)) graphically as a waveform mapped against time (t) in Step 211. This channel signal data (S(t)) is presented over one path to an FFT processor at Step 212 in the example shown, and from there to a selected or adaptively formed filtering process at Step 213 for the peaks identified as A, B, C and D in Step 212, and from there on a second path directly to the filtering process from the original data channel in Step 214. The results of this comparison may be represented by a GUI display in Step 205, which shows, for example, an image representing separate frequencies sorted by proximity.

Figure 2A:
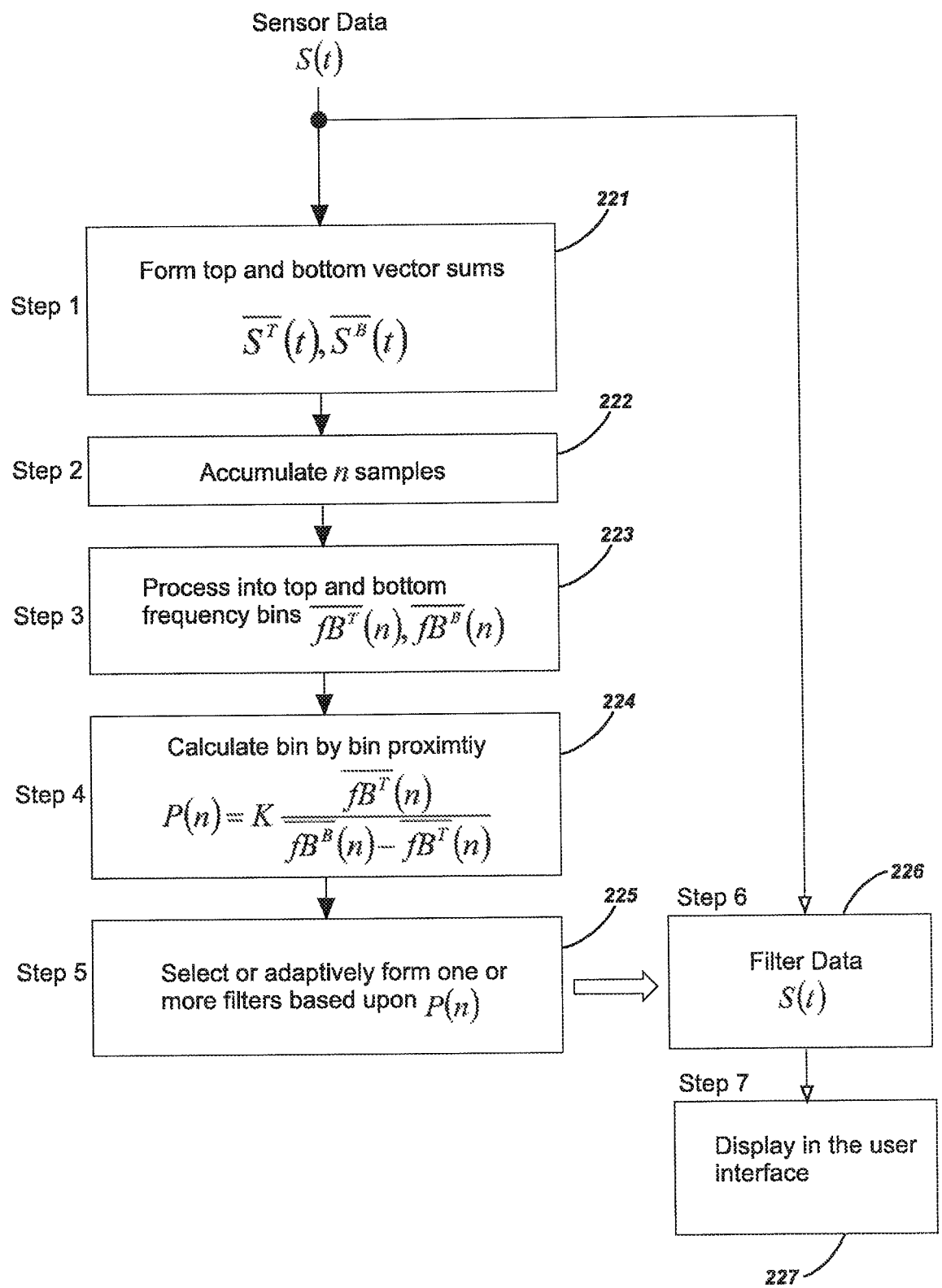
FIG. 2A is a flowchart illustrating an exemplary embodiment of a method of this invention whereby signal values ($S_t$) are sampled, processed into frequency bins and processed bin by bin based on proximity.

FIG. 2A is a flowchart illustrating an exemplary approach to computing frequencies relative to proximity. In an exemplary embodiment of the method of this invention, individual channel data from two or more spaced apart detector arrays capable of measuring the total field is passed to a transformation or power spectrum estimation process performed on a block of preferably synchronous data from each detector array channel. In another exemplary embodiment of the method of this invention, three or more channel data from two or more spaced apart detector arrays capable of measuring the total field are vector summed into multiple data streams representative of the total signal magnitude as measured by each detector array. A transform or power spectrum estimation procedure performed on a block of preferably synchronous data from each detector array produces data for relative signal energy as a function of frequency. Calculations identify frequency bins associated with signals that originate closer to one of the several detector arrays. It should be appreciated that other embodiments of this method may incorporate other useful methods for proximity calculation and the specific method(s) discussed herein are not intended to limit the scope of the claimed invention.

In FIG. 2A, sensor data S(t) is formed at Step 221 into vector sums for the top (upper) and bottom (lower) antenna arrays, $\overline{S}^T(t)$, $\overline{S}^B(t)$. In Step 222, n samples of this process are accumulated. The block of data thus formed is processed in Step 223 into frequency bins for the Top and Bottom signal data, respectively, $\overline{fB}^T(n)$, $\overline{fB}^V(n)$ In Step 224, the frequency bins are processed to yield proximity values P(n) for each of the n sources. Step 224 introduces the constant K, which depends on the spacing between the upper and lower antenna arrays in this example. Locator 108 may be reconfigured to accommodate different array numbers and/or spacing. The calculation performed in this example is provided in Eqn 1:

$$P_n = K \frac{\overline{fB}^T(n)}{\overline{fB}^B(n) - \overline{fB}^T(n)}. \qquad \text{[Eqn. 1]}$$

After Step 224, in Step 225, one or more filters is selected or adaptively formed responsive to the computed value of P(n) from Eqn. 1. These filter(s) are applied to the unprocessed sensor data {S(t)} at Step 226 and the resultant filtered data are sent for conversion to a GUI image for display at Step 227.

Figure 2B:
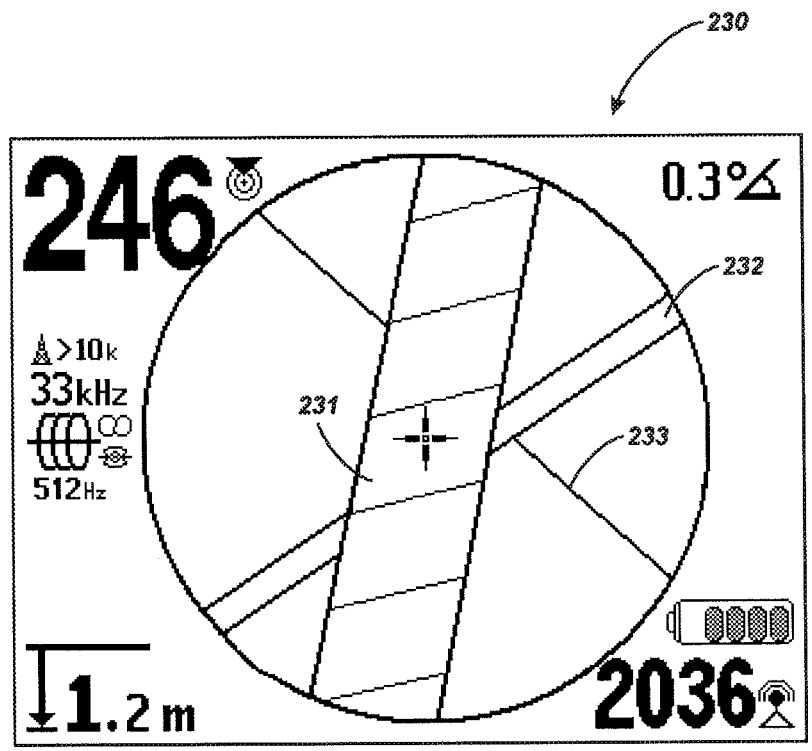
FIG. 2B is a schematic diagram illustrating an exemplary graphical user interface (GUI) display embodiment showing the results of the filtering step of FIG. 2A.

FIG. 2B provides an exemplary GUI image 230 portraying a representation of data produced from the process described in FIG. 2A. In FIG. 2B, the closest signal is a 33 kHz trace, shown as the top layer 231. Beneath layer 231, two other signals are shown, a broadband >10 kHz trace 232 and below it, a 512 Hz detection 233. These signal representations are displayed as layers ordered according to their calculated proximity, with the closest disposed uppermost.

Figure 2C:
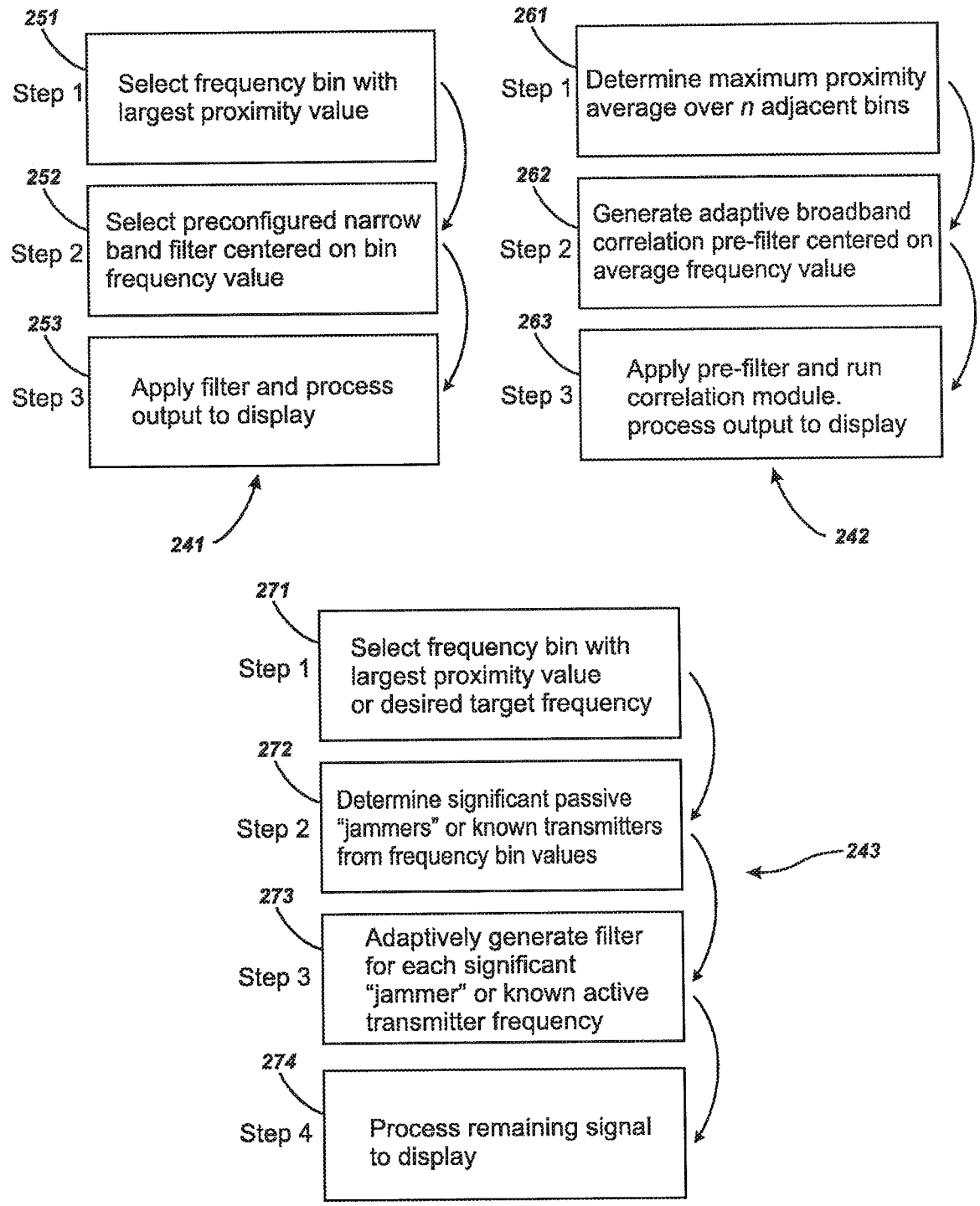
FIG. 2C is a flowchart illustrating two exemplary filtering methods using preconfigured or adaptive notch filtering selected according to the proximity of the source for each frequency detected.

FIG. 2C illustrates three exemplary embodiments 241, 242 and 243 of the method of Step 225 (FIG. 2A) for selecting or adaptively forming filters responsive to the proximity values {P(n)}. In Example 241 (preconfigured filtering for proximity), the frequency bin associated with the largest proximity value P(max) is selected in Step 251 and a preconfigured narrowband filter centered on this P(max) frequency at Step 252. This preconfigured narrowband filter is applied to the signal data stream and the output is processed to generate an image for display at the GUI at Step 253.

In FIG. 2C, Example 242 (adaptive broadband filtering for proximity) begins at Step 261 with the computation of the proximity values P(n) in each frequency bin to identify the n adjacent bins having the highest average proximity value P, where n is chosen in some useful manner. At Step 262, a broadband correlation filter is generated so that it is centered on the average frequency value of the n identified bins. The broadband filter is applied and the output is processed for display at the GUI at Step 263.

In FIG. 2C, Example 243 (adaptive filtering to enhance target signal SNR) begins at Step 271 where adaptive filtering and/or notch filtering is applied to enhance the signal-to-noise ratio (SNR) of the target signal and a frequency bin with the largest proximity value is then selected, or alternatively, a frequency bin containing values for a target frequency is selected. In Step 272, frequency-bin values are evaluated to identify any significant "jammers" in the locating environment. In Step 273, the notch filtering necessary to reduce the signal levels of any significant jammers with respect to the target signal frequency bin from Step 271 is adaptively generated. Finally, at Step 274, the new notch filter(s) are applied to the signal data stream and the necessary images are generated and presented to the GUI display. Any such "jammers" might be, for example, local EM noise generators or, for example, a known active transmitter frequency (sonde) used simultaneously in the target location effort.

The exemplary methods described above in connection with FIGS. 2A and 2C are useful embodiments. A Fast Fourier Transform (FFT) or similar procedure is performed on a block of preferably synchronous data from each detector array channel. The result is data representing signal energy as a function of frequency allocated to some number of predetermined frequency bins for each detector array channel. A corresponding signal vector and associated vector magnitude may then be computed for each frequency bin associated with each spaced apart detector array. A proximity calculation is then performed for each bin and from these calculations, filters may be adaptively formed and/or pre-configured filters may be selected and applied to the stream of sensor data ($S_t$). In these examples, the three sensors in the Top and Bottom arrays or nodes of the locator are combined to create vector magnitude values for each array.

According to one aspect of the system of this invention, three channel data from a three-or-more-channel full field detector array is passed to a power spectrum estimator and/or transformation technique to yield signal energy as a function of frequency by channel allocated to n frequency bins. Vector magnitude is then computed for each frequency bin and filters are chosen or developed adaptively to optimize the transfer of signal frequencies unique to each vector grouping. As an example of a power spectrum estimator and/or transformation technique, an FFT is performed on data from each channel of each detector array. The result, for each channel, is signal energy as a function of frequency, allocated to some number of predetermined frequency bins (as in FIG. 1F). A signal vector and associated vector magnitude are then computed for each frequency bin. By any useful means known in the art, vector groupings are identified from vector orientation and magnitude values corresponding to signal energy from different sources. Separate filters may then be chosen to optimize transfer of the frequencies unique to each vector grouping.

Figure 3A:
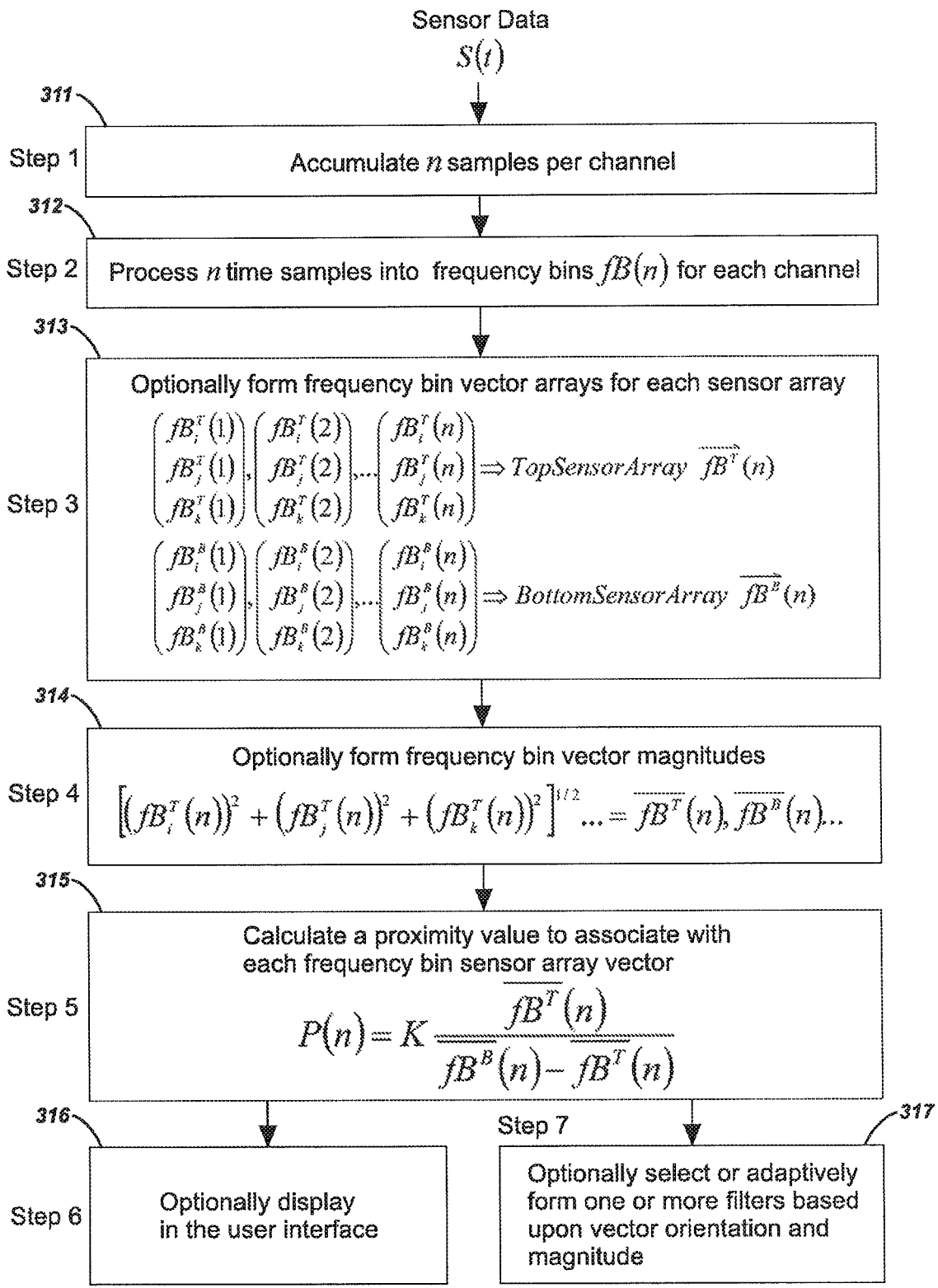
FIG. 3A is a flowchart illustrating another exemplary embodiment of a method of this invention whereby signal values ($S_t$) on multiple channels are filtered and processed to identify vector groupings selected according to magnitude and orientation values.

FIG. 3A is a flowchart illustrating an exemplary embodiment of the method of this invention in which a number of samples for each of a number of channels are first processed to determine field vectors and signal proximities. The flowchart illustrates the principle of bin sorting by proximity when applied to each data channel separately rather than to the combined vector sums. Step 311 accumulates n samples for each channel, and Step 312 sorts the samples into frequency bins segregated by data channel. Step 313 forms a series of frequency bin vectors, one per data channel, and Step 314 organizes these vectors into frequency-bin vector magnitudes, which may also be transferred to the analysis process illustrated in FIG. 3B if no filtering is desired.

Continuing with FIG. 3A, Step 315 analyzes the frequency bin magnitude values to identify vector groups according to the orientation and magnitude of the several vectors by any useful means known in the art and the vector group data is processed for GUI display at Step 316. Alternatively, the process may branch to Step 317 for selection or adaptive generation of filters responsive to vector orientation or magnitude values.

Figure 3B:
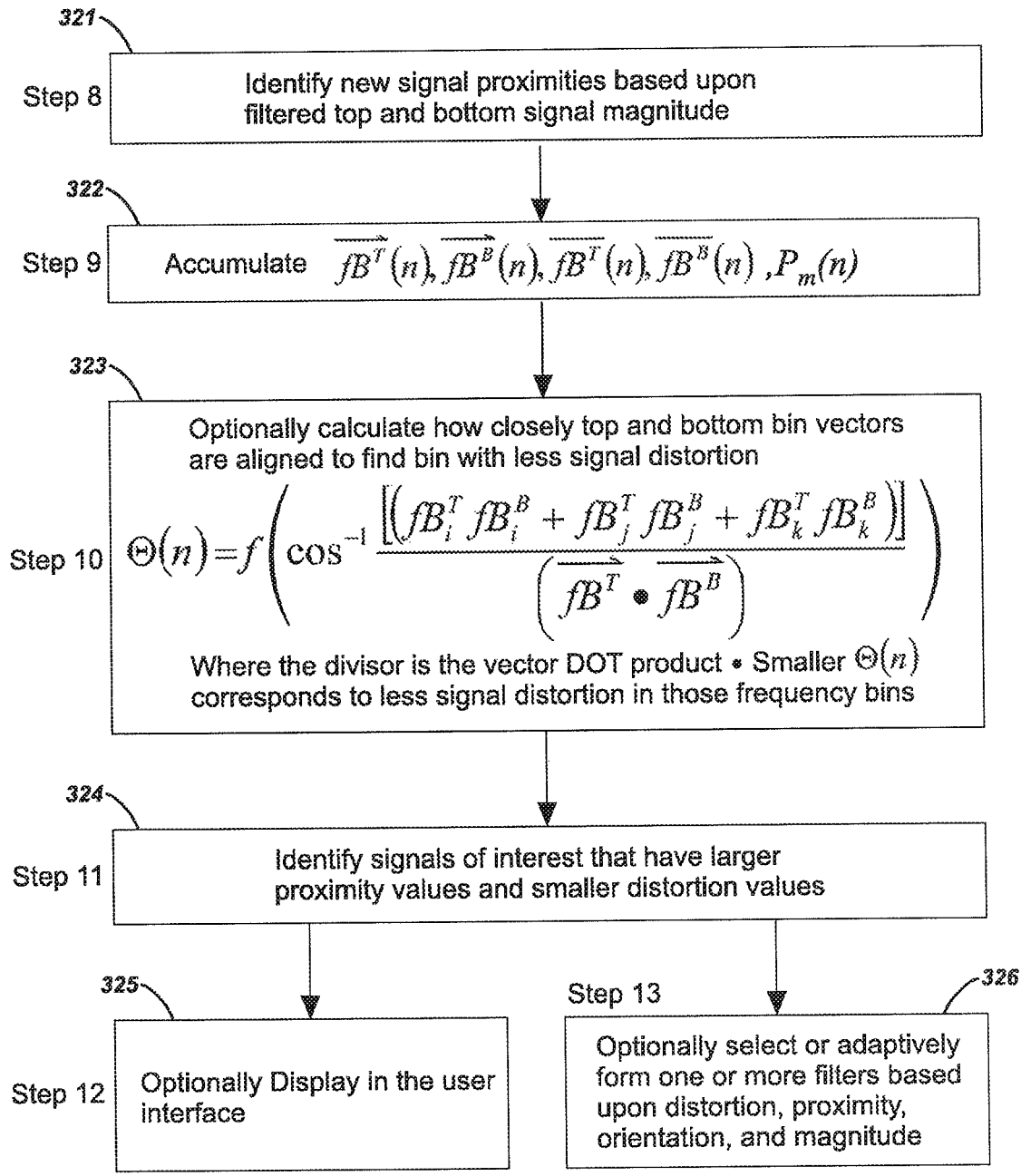
FIG. 3B is a flowchart illustrating an exemplary method for differentiating distortion values by comparing the vector alignments in the vector groupings determined according to the method of FIG. 3A.

FIG. 3B is a flowchart illustrating an exemplary method for differentiating distortion values by comparing the vector alignments found in the vector groupings determined at Steps 314 and/or 317 (FIG. 3A). In FIG. 3B, Step 321 passes the vector magnitude and orientation values to Step 322 for a calculation to determine a proximity value associable with each frequency-bin sensor array vector. Step 322 is accomplished using Eqn.

$$P_n = K \frac{\overline{fB^T}(n)}{\overline{fB^B}(n) - \overline{fB^T}(n)}. \quad [\text{Eqn. 2}]$$

In Eqn. 2, the constant K is proportional to the fixed distance between the upper and lower antenna nodes 106, 108 (FIG. 1). From these Eqn. 2 proximity values, Step 323 may (optionally) calculate distortion according to Eqn. 3 to identify those frequency bins with less signal distortion, which is related to the variable $\Theta$ from Eqn. 3:

In Eqn. 3, f is some generally monotonic function so that a $\Theta$ value close to zero indicates less distortion between Top and Bottom sensor arrays. The use in the divisor of the scalar product of two vectors assumes an orthonormal vector space.

$$\Theta(n) = f\left\{\cos^{-1} \frac{[(fB_i^T fB_i^B + fB_j^T fB_j^B + fB_k^T fB_k^B)]}{\left(\overline{fB^T} \cdot \overline{fB^B}\right)}\right\}. \quad [\text{Eqn. 3}]$$

In Eqn. 3, f is some generally monotonic function so that a $\Theta$ value close to zero indicates less distortion between Top and Bottom sensor arrays.

This distortion measure allows Step 324 to identify signals of interest having larger proximity values (Eqn. 2) and lower distortion values (Eqn. 3), which are then processed for display at the GUI in Step 325. Alternatively, Step 326 may select or adaptively generate filters for producing results filtered responsive to the proximity, distortion, magnitude and/or orientation values of the several vectors.

Note that to save computation time it is possible to calculate only Top (upper) array magnitude values rather than the complete vectors, to provide proximity results only, omitting calculation for distortion.

Signals of interest may be filtered based on distortion values alone when these are available from Eqn. 3 calculations. One useful method for such a calculation is to determine the difference angle $\Theta_n$ between each corresponding T vector (Top Array) and corresponding B vector (Bottom Array), frequency bin by frequency bin. With this method, the corresponding vectors are most closely aligned and the $\Theta_n$ values are small when less field distortion is found between the two or more spaced apart 3D sensor arrays.

Figure 4:
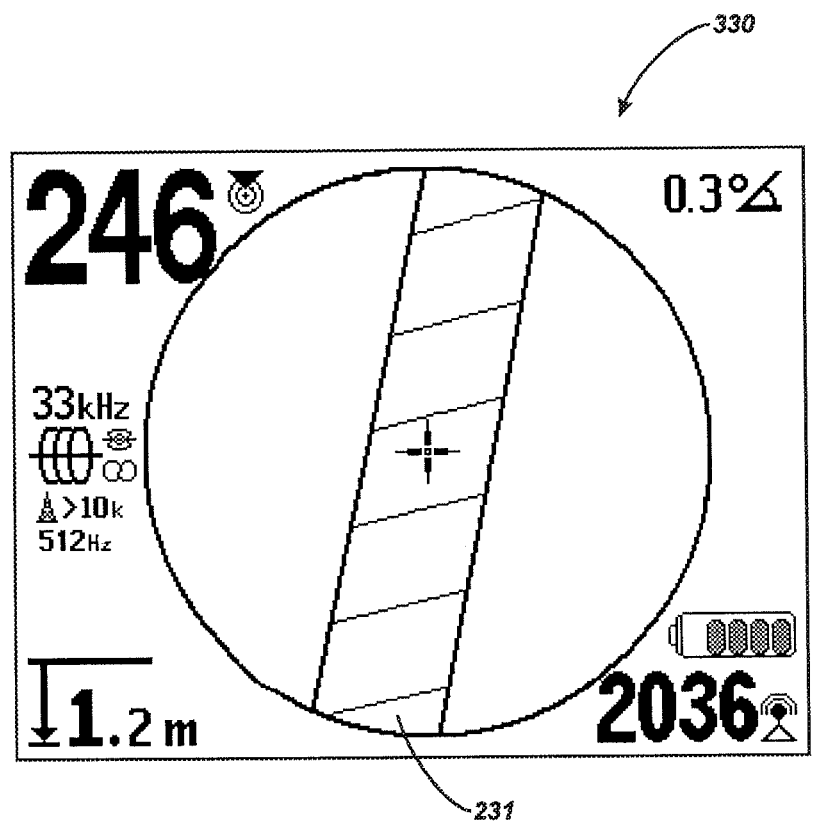
FIG. 4 is a schematic diagram illustrating an exemplary GUI display embodiment for displaying the processing results of the method of FIG. 3B.

FIG. 4 illustrates an exemplary GUI display image 330 for portraying the results of the processes of FIGS. 3A-B. FIG. 4 may be appreciated with reference to the above discussion of FIG. 2A. Other exemplary GUI display images and methods are now discussed in connection with FIGS. 5A, 5B, and 6.

Figure 5A:
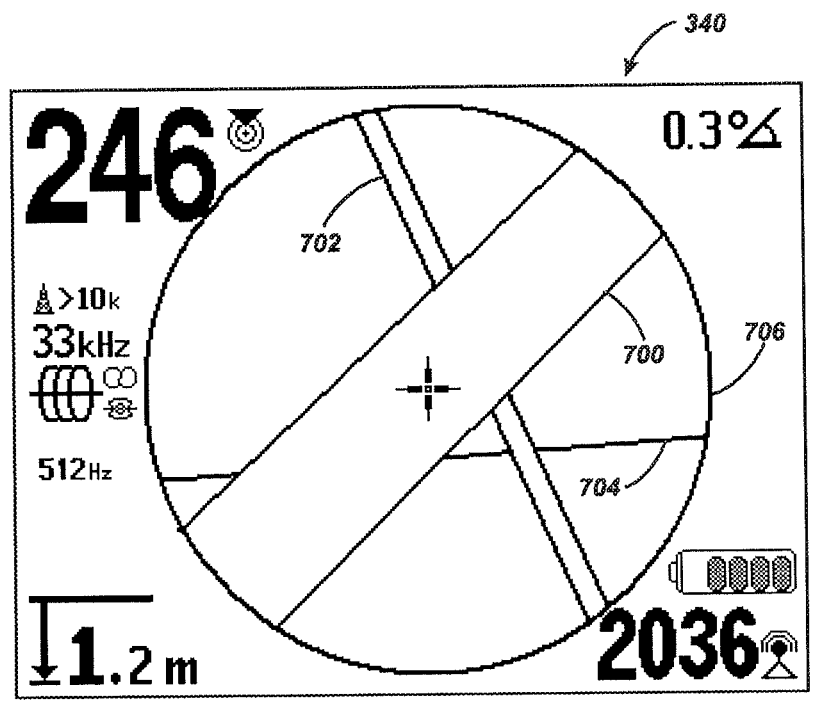
FIG. 5A is a schematic diagram illustrating an exemplary GUI layered display having a wider, closer trace line superimposed over other deeper detected traces.

According to another aspect of the system of this invention, information from the locator instrument processors is displayed in independent layers so that the graphic display image responds to filtered signals to indicate the presence and relative location of either one or more lines or a sonde or both. FIG. 5A is a display screen image 340 portraying a method of displaying detection information from a locator in a layered fashion. In FIG. 5A, a frequency detection with a near proximity is portrayed as a wide trace 700 in the top image layer of the display area 706. A second trace 702 represents a signal with a more distant proximity value in an intermediate image layer, and the trace 704 represents a third signal having a yet more distant proximity value in a lower image layer. In operation, these trace representations 700, 702 and 704 might represent sonde signals or line-trace detections. The layer of each detection represented changes according to changes in the relative proximity during the locate effort.

Figure 5B:
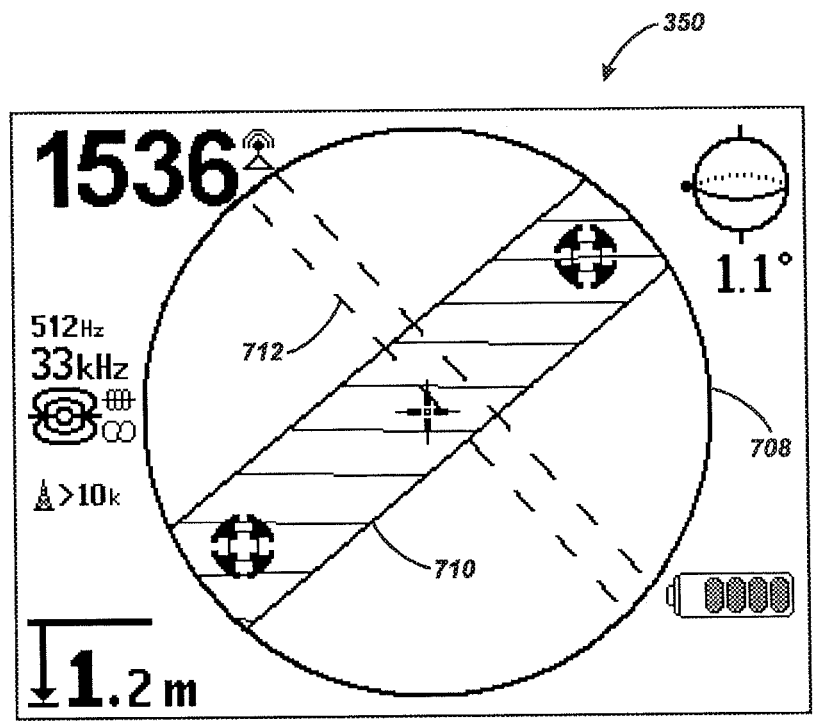
FIG. 5B is a schematic diagram illustrating an exemplary GUI layered display of a sonde detection in the foreground superimposed over a simultaneously-detected 33 kHz trace in the background.

FIG. 5B is a display image 350 demonstrating that the display can provide the locator operator with real-time (or near real-time) information on two or more targets simultaneously, including line conductors (utilities) or dipole transmitters (sondes), and that such information may include the relative proximities of all such targets. Image 350 shows two signals portrayed simultaneously in the display area 708 of locator 104 (FIG. 1A) where the line 710 in the upper image layer represents the detection of a proximate sonde and the trace 712 in the lower image layer represents the detection of a more distant 33 kHz line.

Figure 6:
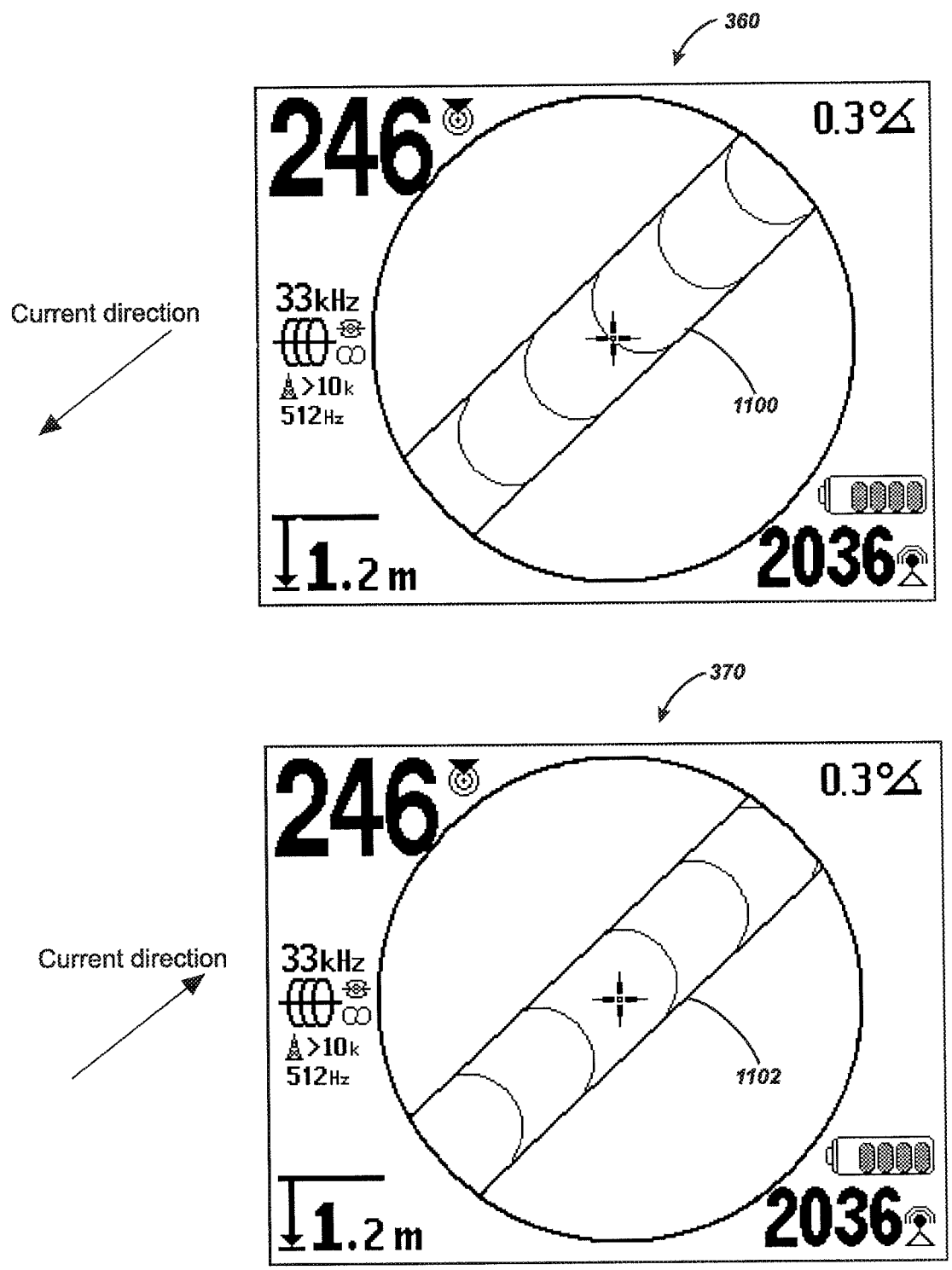
FIG. 6 is a schematic diagram illustrating an exemplary GUI display of two tracing lines each having curved elements representing the current flow direction detected by the locator.

According to another aspect of the system of this invention, the current flow direction in the detected conductor is computed and graphically displayed to the operator using icons such as, for example, a series of curved segments associated with the gradient line. FIG. 6 shows two exemplary images 360 and 370 using curved segments to represent the direction of current flow in a detected conductor. In image 360, the current direction in conductor 1100 is toward the bottom of the screen, and in image 370, the current direction in conductor 1102 is in the direction opposite to that in conductor 1100. Alternatively, the curved segments showing direction of current may be displayed as moving in the current direction at a rate that corresponds to the calculated current magnitude in the detected conductor. Alternatively, current direction may be shown by such movement alone without curvature in the segments.

Gradient Calculation and Display

According to another aspect of the system of this invention, separate gradient coils are disposed on the left and right side of the locator for detecting the magnetic field gradient between them. In a preferred embodiment, the signals from these gradient coils and the lower antenna array signals together permit the computation of proximity and depth values from a buried utility detection. This combination of gradient coil and lower antenna array signals may be processed to yield depth and proximity values with useful accuracy when the axis between the two gradient coils is generally disposed perpendicular to the buried utility line with the line generally centered and the gradient coil pair.

According to another aspect of the present invention, separate gradient coils in a locator are used to detect the gradient values of the detected magnetic field on the left and right side of the locator. In a preferred embodiment, the gradient coils of the locator are used in conjunction with the lower antenna array signals to provide a basis for the computation of proximity and depth of a detected buried utility. Using these values, depth and proximity may be calculated with useful accuracy when the gradient coils are approximately centered over the line and perpendicular to the axis of the target utility.

The inputs provided are the signal strength as measured on the three axes of the bottom antenna node, and the signal strength measured by the two gradient coils. A component is calculated of $S_B$ in the direction of the gradient axis. An estimate is made of field strength at a virtual receiver location at the gradient axis. From these values, a depth value is calculated as shown below:

$$\begin{pmatrix} 0 & \sqrt{\frac{1}{2}} & -\sqrt{\frac{1}{2}} & 0 & 0 \\ 0 & 0 & 0 & \frac{1}{2} & -\frac{1}{2} \end{pmatrix} \cdot \begin{pmatrix} B_i^B \\ B_j^B \\ B_k^B \\ G_L \\ G_R \end{pmatrix} \Rightarrow \begin{pmatrix} B_y^B \\ B^G \end{pmatrix} \quad \text{[Eqn. 4]}$$

$$\text{Depth} = \left( \frac{d}{\sqrt{\left(\frac{B_y^B}{B^G}\right)^2 - 1}} \right) \quad \text{[Eqn. 5]}$$

Where: $B^B_{i,j,k}$=signal values from lower antenna $G_R$, $G_L$=Signal strength values from right and left gradient coils d=Distance between bottom antenna and a virtual receiver location at the gradient axis (Note: For dipole fields the final square root would be a 6th root)

Figure 7A:
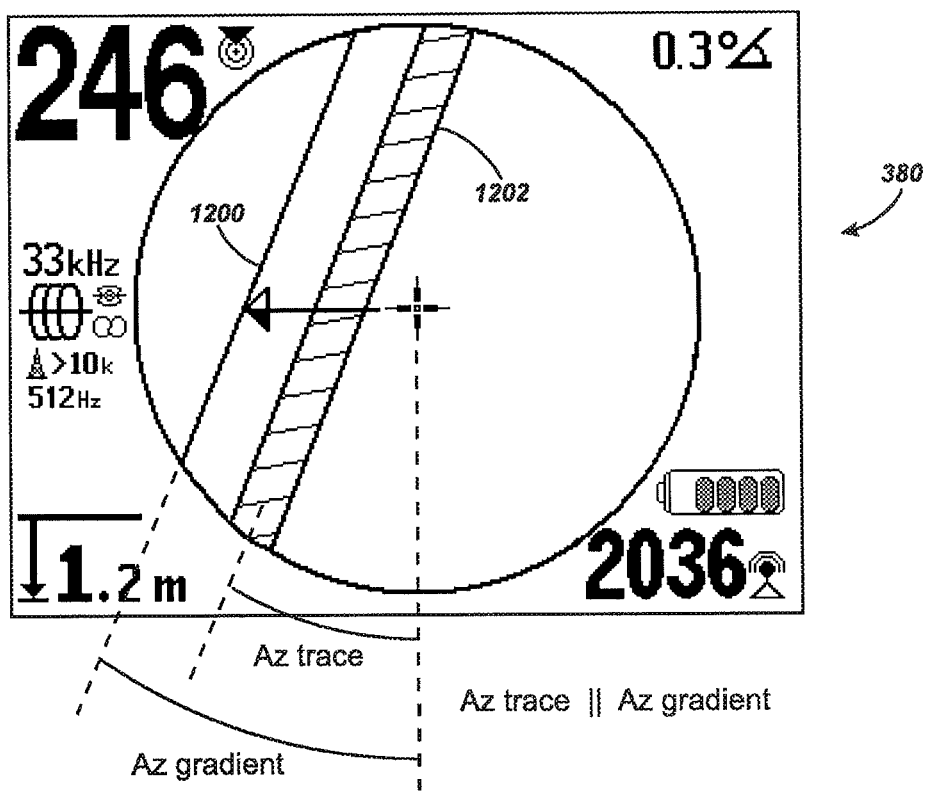
FIG. 7A is a schematic diagram illustrating an exemplary GUI display of a gradient line disposed parallel to a tracing line with the direction of offset displayed as a dynamically-updated indicator arrow.

FIG. 7A is a schematic diagram illustrating an exemplary GUI display image 380 showing a gradient line 1200 disposed parallel to a trace line 1202 with the direction of offset displayed as a dynamically-updated indicator arrow. Gradient line 1200 is determined by a comparison of the field detection ($G_L$) of the left-side gradient coil sensor 113 (FIG. 1A) with that ($G_R$) of the right-side gradient coil sensor 112 (FIG. 1A). If the two signals strengths are equal ($G_R=G_L$), the gradient line 1200 is displayed as concentric with trace line 1202 to indicate that locator 108 (FIG. 1A) is disposed directly above the center of the detected field. In image 380, gradient line 1200 is displayed with an offset of distance Z from trace line 1202 to indicate that the left-side gradient coil 113 is sensing a higher signal strength than the right-side gradient coil 112. In this exemplary embodiment, the value of Z is calculated from Eqn. 6:

$$\text{Offset} = R_m \times (d \times 0.01) \times \cos(\text{Polar}_{Bottom}) \times \frac{(G_R - G_L)}{(G_R + G_L)} \quad \text{[Eqn. 6]}$$

Where: Rm=the map radius in pixels in image 380;
d=calculated depth;
Polar Z $\angle_{Bottom}$=Polar Angle computed from lower sensor array 108; and
$G_R$, $G_L$=Signal strength values from left and right gradient coils (112, 113).

The gradient line is preferably displayed whenever any one or more of the following three criteria are satisfied: (a) The field measured by the two offset gradient coils, located in proximity to a full field vector sensing array comprising the Top and Bottom nodes in FIG. 1A (106, 108), is approximately balanced within some predetermined range; (b) The azimuthal angle of the field measured by full field vector sensor is aligned with the axis of the gradient coil pair (110, 112) to within some predetermined range of angles; or (c) The measured depth or proximity is positive and the magnetic field source is determined to be in the ground below the receiving unit.

In image 380, the angle of gradient line 1200 is set to the azimuthal B-field orientation at the centroid of the Bottom Array, so Θ=Azimuthal.angle.Bottom. Gradient line 1200 is therefore parallel to but displaced from trace line 1202, depending on the signal balance between the two gradient sensor signals $G_R$, and $G_L$.

Figure 7B:
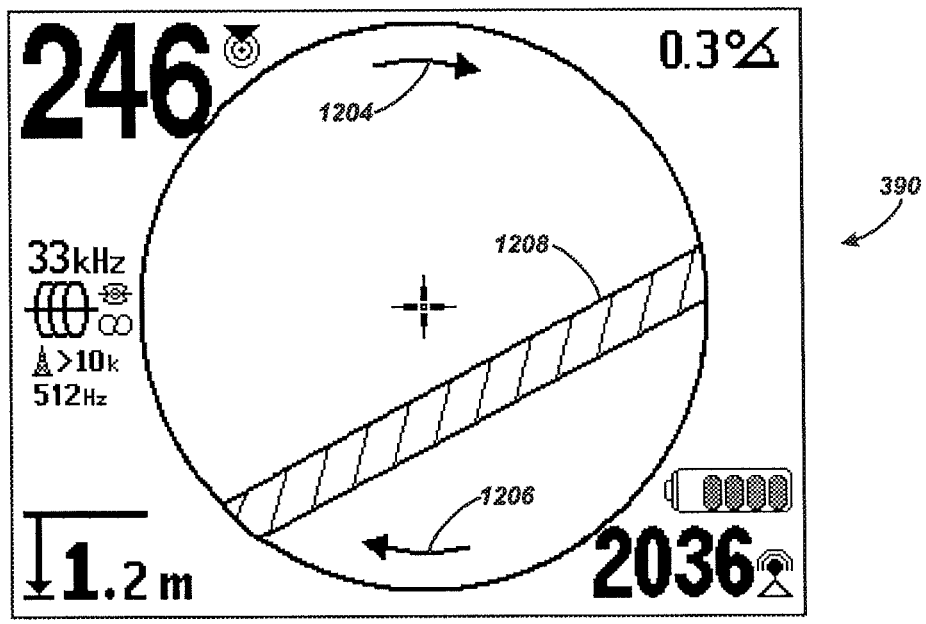
FIG. 7B is a schematic diagram illustrating an exemplary GUI display employing symbols to communicate alignment information to a locator operator.

FIG. 7B provides a display image embodiment 390 that uses symbols to present alignment information to the locator operator (user). In one aspect of the system of this invention, misalignment between the portable locator and a target conductor may be indicated to the operator through the display of, for example, curved arrows indicating the rotational correction needed to align the locator. In image 390, curved arrows 1204 and 1206 are displayed to direct the locator operator to rotate the locator in the direction required to align the gradient axis (defined by the coil pair) with the target conductor. Clockwise curved arrows 1204, 1206 direct the operator to rotate the locator 104 (FIG. 1A) clockwise to align with the trace line 1208, and counterclockwise arrows (not shown) would direct the operator to rotate the locator 104 counterclockwise to do so.

Figure 7C:
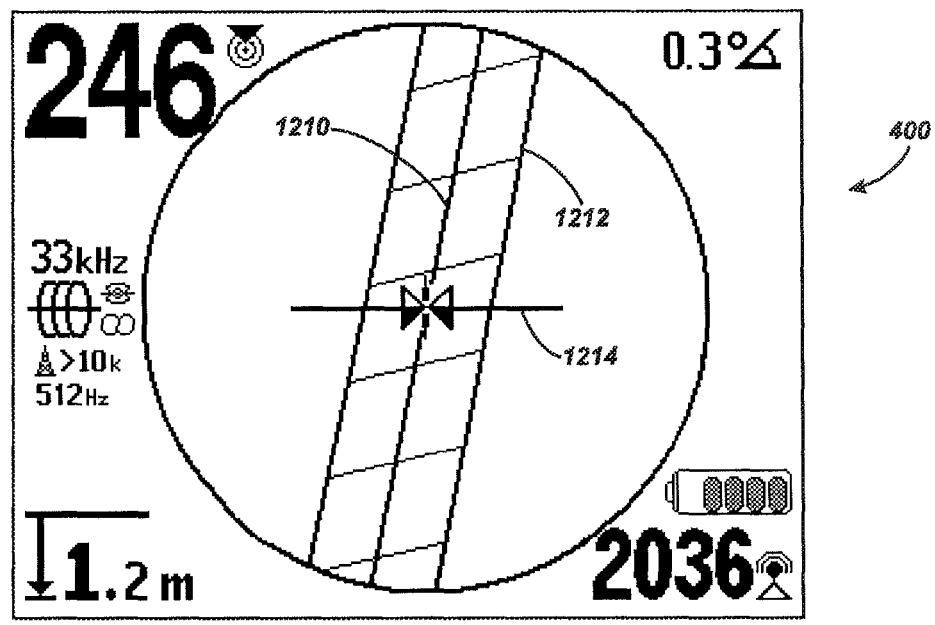
FIG. 7C is a schematic diagram illustrating an exemplary GUI display of balanced gradient coil signals (equal signal strength) represented as a gradient line centered in the tracing line.
Figure 7D:
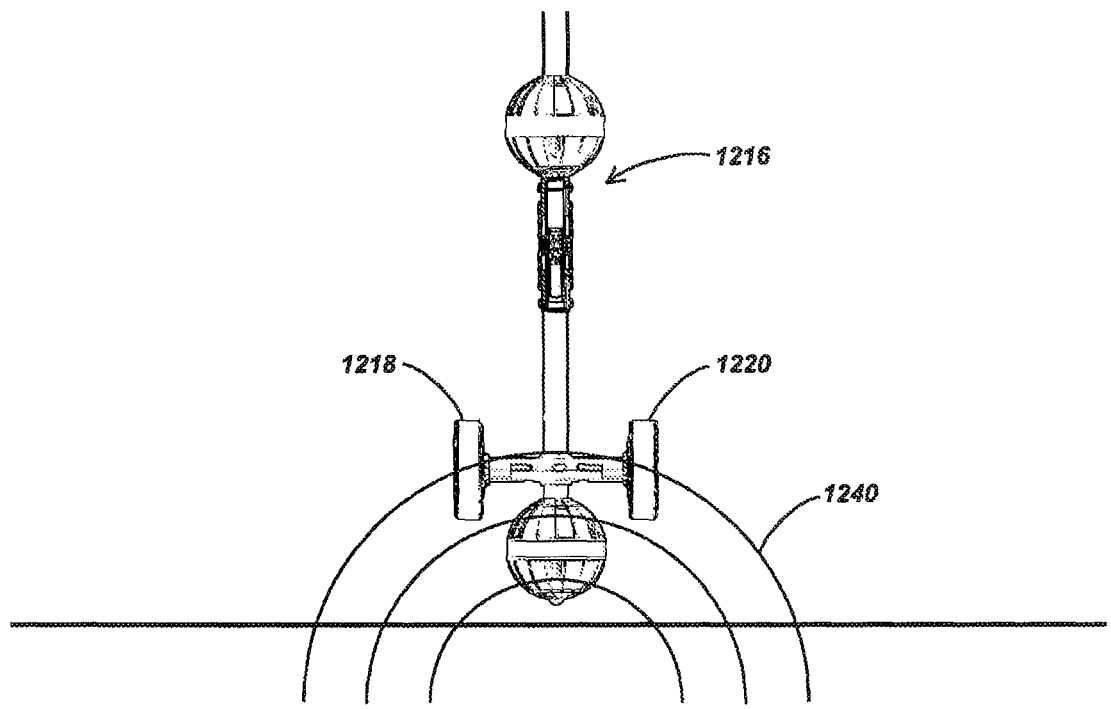
FIG. 7D is a schematic diagram illustrating a locator disposition suitable for producing the display of FIG. 7C.

FIG. 7C shows an exemplary display image 400 for displaying a condition in which the signals from the left gradient coil 113 (FIG. 1A) and the right gradient coil 112 (FIG. 1A) are balanced. In this exemplary embodiment, a gradient balance indication image provides a pair of displacement arrows 1214 disposed generally perpendicular to the azimuthal projection 1212 into the plane of the display of the local magnetic field vector determined by a 3-D full-field vector sensing array. This gradient balance indication 1214 is displayed only when one or more field measurement criteria are satisfied. The gradient balance indication of this invention may be a line displayed on a graphical user interface and may be displayed at the center of the mapping area of a graphical user interface when the two gradient coil signals are generally balanced and the measured field is generally equal in each coil. In FIG. 7C, the gradient line 1210 is centered along the trace line 1212, and the displacement arrows 1214 point inward toward the gradient line 1210. The display image 400 indicates that the locator 104 (FIG. 1A) is disposed directly over the center of the detected trace line field. FIG. 7D illustrates a disposition of a locator 1216 with gradient coil antennas 1218, 1220 embodied as side-wheels, relative to the normal field 1240 under the conditions indicated in image 400 (FIG. 7C).

Figure 7E:
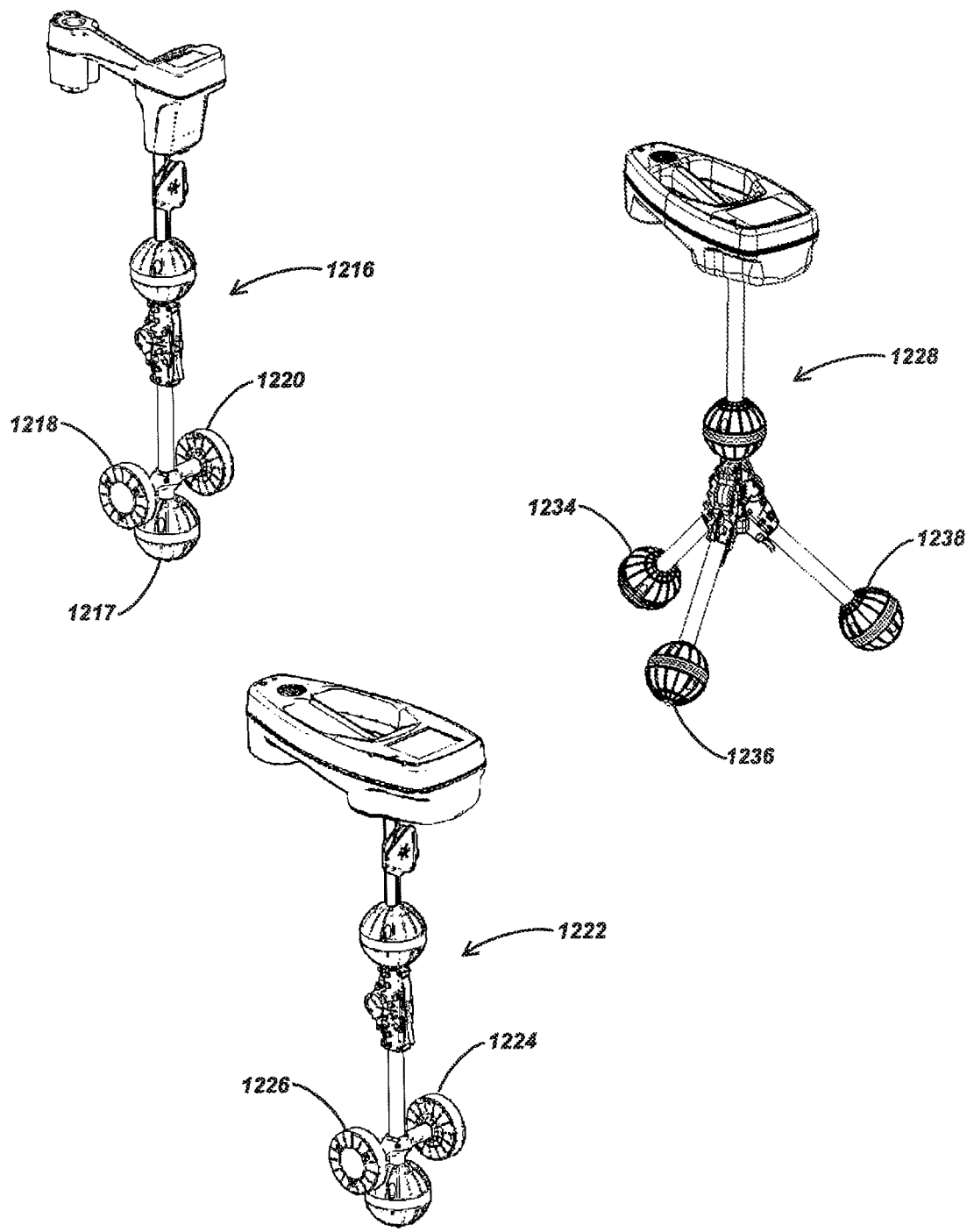
FIG. 7E is a perspective view of several exemplary locator system embodiments, each showing the physical gradient coil sensor dispositions suitable for performing a particular method embodiment of this invention.

FIG. 7E shows a perspective view of three exemplary locator embodiments 1216, 1222, and 1228. Each locator embodiment 1216, 1222, and 1228 employs a useful physical gradient coil sensor arrangement suitable for use with the method of this invention. In locator 1216 (also denominated the SR-20 model), the gradient coils 1218 and 1220 are disposed at an offset above the lower antenna node 1217. In locator 1222 (also denominated the SR-60 model), the gradient coils 1226 and 1224 are disposed similarly to those in locator 1216. In locator 1228 (also denominated the "self-standing" locator), three omnidirectional 3D antenna nodes 1234, 1236, and 1238 are disposed to replace the usual single lower antenna node 1217 seen in locator 1216. Operating together, the three lower nodes 1234, 1236, and 1238 provide three sets of three-dimensional B-field data, which may be processed to define the azimuthal magnetic gradient so that the separate pair of single-axis gradient coils is unnecessary for this purpose. With locator 1228, Eqns. 4-6 above are revised to accommodate the additional available 3-axis field data, from which the azimuthal gradient components may be quickly derived with reference to one or more of the above-cited commonly assigned patent applications incorporated herein by reference.

Variable-Time Bandpass Filter

In one aspect of system of this invention, an adjustable variable-time bandpass filter is coupled to a signal quality determining means to facilitate adjustment of the filter time-constant responsive to a signal quality measure. In one embodiment, such adjustment is made automatically.

Figure 8A:
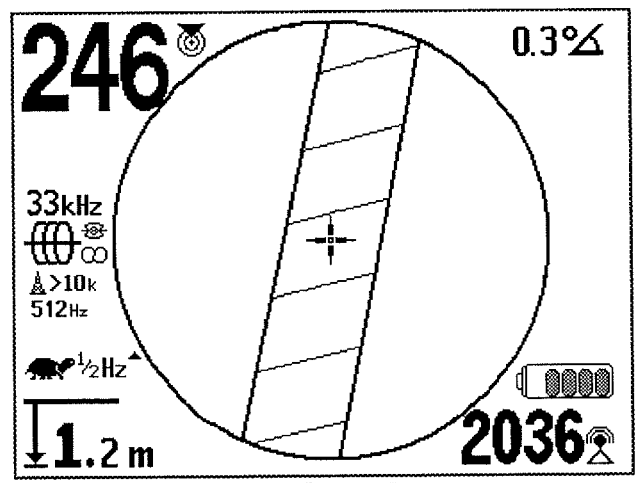
FIG. 8A is a schematic diagram illustrating an exemplary GUI display demonstrating the use of a variable-time bandpass filter using a filter half-width of ½ Hz.

FIG. 8A is an exemplary locator display image for indicating when a variable-time bandpass filter is applied with the filter half-width set to ½ Hz. In narrow-band filtering applications, the filter half-width defines a passband frequency window outside of which the signal is rejected. Thus, in FIG. 8A, any signal frequency component more than ½ Hz above or below the nominal seeking frequency is rejected, thereby eliminating nearby jamming signal frequencies in noisy environments, for example.

In broadband filtering applications, the variable-time bandpass filter operates to enhance the signal-to-noise ratio (SNR) by changing the sampling size per unit of time (and the sampling rate). When the filter half-width is reduced, as in FIG. 8A, more signal samples of smaller size are collected, requiring a longer period to process a block of data and thereby providing a higher SNR. Conversely, when the filter in broadband situations is set to a higher filter half-width value, such as 8 Hz, the SNR is lower, but the locator response time changing conditions is proportionately faster.

Figure 8B:
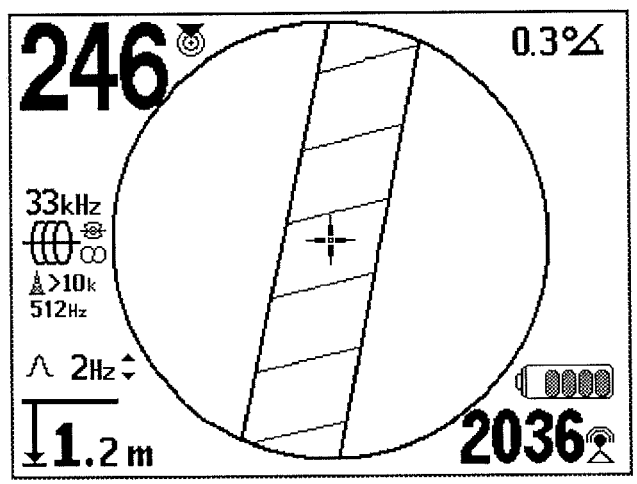
FIG. 8B is a schematic diagram illustrating an exemplary GUI display demonstrating the use of a variable-time bandpass filter using a filter half-width of 2 Hz.
Figure 8C:
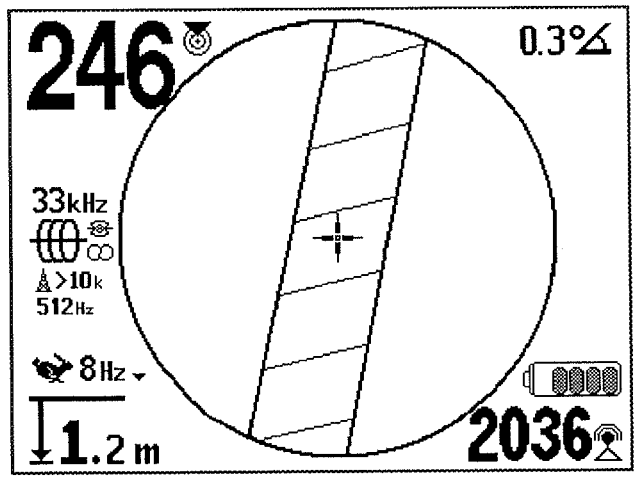
FIG. 8C is a schematic diagram illustrating an exemplary GUI filter display demonstrating the use of a filter half-width of 8 Hz, the filter having adjusted responsive to the circumstances of the locating task.

FIG. 8B is the exemplary locator display image of FIG. 8A revised to indicate that the variable-time bandpass filter is applied with the filter half-width set to 2 Hz. In narrow-band filtering applications, this filter half-width reduces the SNR over that available for the ½ Hz filter but increases the SNR over that available from the 8 Hz filter, the display image for which is shown in FIG. 8C. Conversely, the response time for the filter shown in FIG. 8B is reduced by the filter setting shown in FIG. 8C and increased (slower) by the filter setting shown in FIG. 8A. In narrowband applications, the higher 8 Hz setting in FIG. 8C permits processing of signals having frequencies up to 8 Hz above or below the nominal line search frequency, which may be useful when signal distortion is present, for example, or when other environmental factors increase the importance of margin frequencies.

In another aspect of the system of this invention, input from an on-board 3-axis compass and an on-board 3-axis accelerometer may be used to provide additional data useful for describing relative locator motion. When the locator is moving, the system of this invention may automatically select the time-variable settings needed for faster refresh rates to accommodate the increased rate of change to the locate situation. If locator motion declines or halts, the system may responsively adjust the time-variable bandpass values to improve SNR by lowering system response time.

In another aspect of the system of this invention, a first harmonic of a detected signal is filtered by a first bandpass filter and a second harmonic of the same signal is filtered by a second bandpass filter to produce a composite signal. This composite signal, produced by a combination of these filters, is then used to create a GUI display image adapted to indicate the presence of a hidden utility or sonde.

Figure 9A:
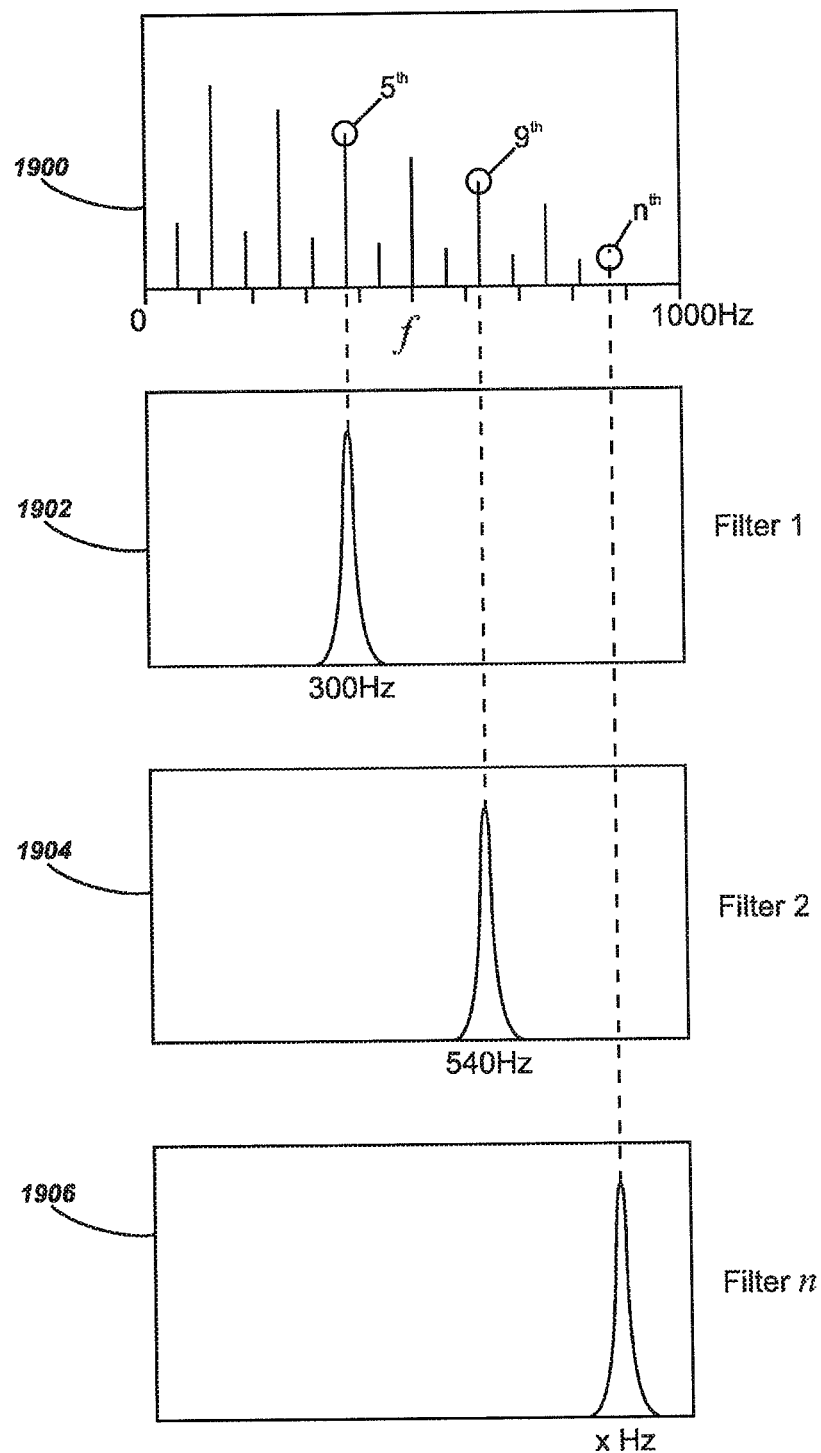
FIG. 9A is a schematic diagram illustrating an exemplary embodiment of the method of this invention for operating several filters with time-multiplexing.

Alternatively, two or more of such bandpass filters may be applied serially to a signal. FIG. 9A illustrates the signal spectrum 1900 with the 5th, 9th and nth harmonics of 60 Hz marked. Applying the first filter 1902 in a series limits the output to the 300 Hz signal frequencies as shown. Applying the second filter 1904 in the series limits the output to the 540 Hz signal frequencies as shown. Applying the nth filter 1906 in the series limits the output to the x Hz signal frequencies as shown. The combined results of two or more of such bandpass filters may then be processed to produce a GUI display image.

Figure 9B:
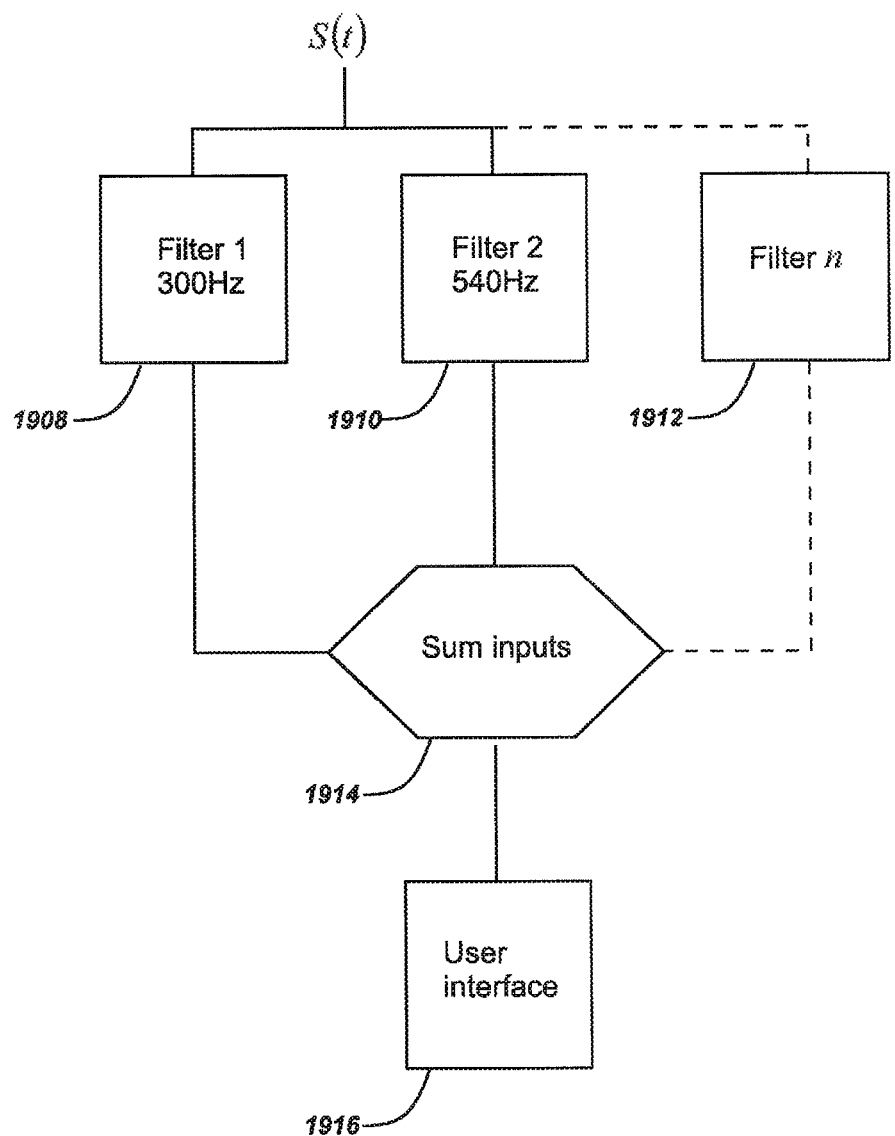
FIG. 9B is a block diagram illustrating a process for summing the outputs of filters tuned to the 5th, 9th and Nth harmonics of 60 Hz.

FIG. 9B is a flow chart of an exemplary embodiment of this process. In FIG. 9B, signal S(t) is passed simultaneously through a filter 1908 for 300 Hz, a filter 1910 for 540 Hz and a filter 1912 for x Hz. The outputs from these filters are then presented to a summing block 1914 for producing a composite output that is then presented to the user interface 1916 for generation of the required GUI display image (not shown).

In another aspect of the system of this invention, a display image for indicating the presence of one or more hidden sondes or utilities is produced by employing a combination of a first narrowband notch filter for attenuating one or more predetermined frequencies and a second broadband filter having a passband overlapping the same predetermined frequencies.

Figure 10:
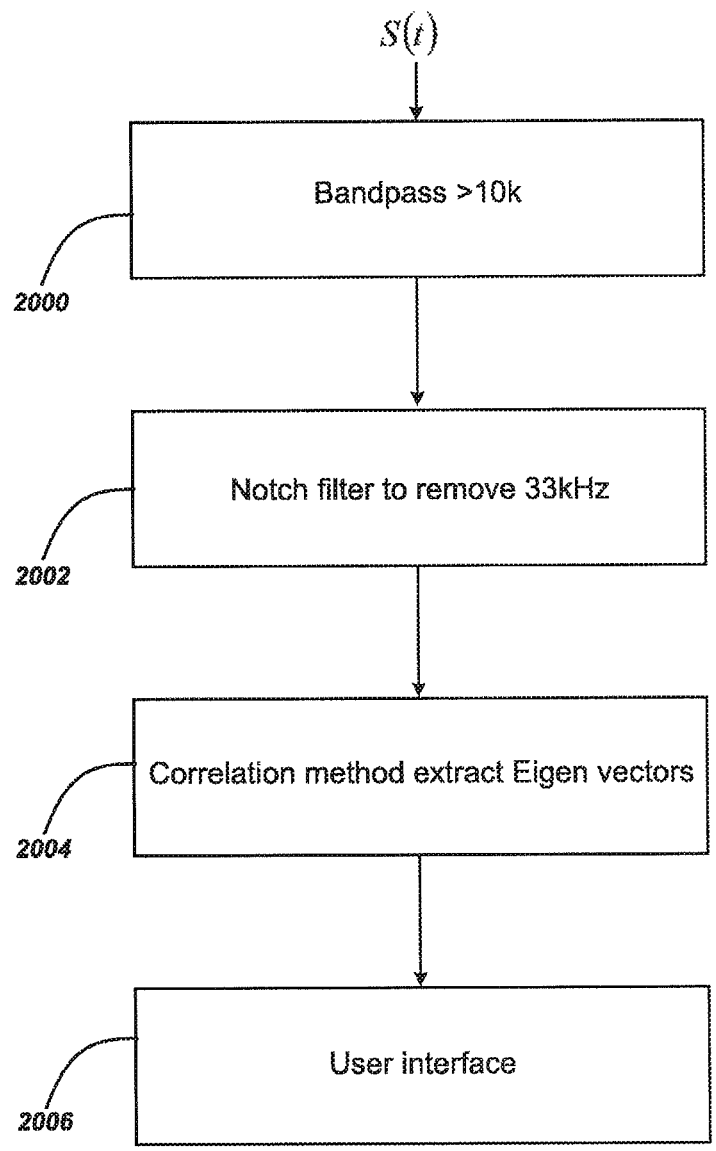
FIG. 10 is a block diagram illustrating a process for using a notch-filter to remove a particular band from a search band.

In another aspect of the system of this invention, a display image for indicating the presence of one or more hidden sondes or utilities is produced by employing a combination of a first narrowband notch filter for attenuating one or more predetermined frequencies and a second cross-correlation process according to the method shown in FIG. 10. A broadband filter 2000 for frequencies greater than 10 kHz is first applied to signal S(t). The output is presented to the notch filter 2002 to remove a predetermined frequency (33 kHz in this example). This filter 2002 may, for example, be used to mask an active-trace signal frequency while passively detecting other search environment frequencies that may otherwise be masked by the stronger active-trace signal.

In FIG. 10, the notch filter 2002 removes the 33 kHz signal frequencies from the >10K signal band so that the >10 kHz signals may be separately detected passively, for example, during the simultaneous pursuit of a 33 kHz active trace signal on a separate channel. This prevents leakage of the actively pursued 33 kHz trace signal from leaking into the passive >10 kHz search data processing. This feature advantageously permits the simultaneous search for sources in a passive search band and a predetermined active search trace frequency, which facilitates alerting the locator operator to unknown conductors in the vicinity of his active search, for example. It may be readily appreciated that this aspect of using such filtering to facilitate the simultaneous search for multiple target frequencies is not limited by the exemplary embodiments described herein.

In the exemplary multiple electromagnetic field source environment of FIG. 1A, for example, an active frequency such as 33 kHz may be placed on a first conductor 114 while a more deeply buried conductor 116 is re-radiating some passive energy in the >10 kHz range. The filtering method described above facilitates the clear simultaneous detection of both signals and the discrimination between their source locations by preventing active 33 kHz signal components from masking the weaker passive signals from conductor 116 in the >10 kHz band. Alternatively, a single filter with a passband for passing all frequencies >10 kHz and a notch-band for attenuating the 33 kHz signal may be provided to the same effect, or the individual filters may be applied serially in either order, for example. A cross-correlation process, such as is described in the above-cited U.S. Pat. No. 7,136,765 and incorporated herein in its entirety by reference, may then be applied to the filtered output. Referring again to FIG. 10, the correlation process 2004 is applied to extract eigenvalues and eigenvectors from the correlation matrix generated from the filtered signals, and the resultant field vector of the signal emission is processed in UI 2006 to produce the required GUI display image.

In another aspect of the system of this invention, a first bandpass filter is configured to filter some predetermined sonde frequency and a second bandpass filter is configured to filter a predetermined line-tracing frequency, thereby providing a signal useful for indicating at the UI the presence and general location of a line, a sonde, or both. In yet another aspect of the system of this invention, one bandpass filter is configured to select a predetermined sonde frequency while a second filter is configured for broadband detection of line trace frequencies. Signal information from both filters is then used to create a display image for indicating the presence of a hidden sonde at the predetermined sonde frequency and any line signals emanating within the second broadband bandwidth.

In another aspect of the system of this invention, the locator mode is automatically switched responsive to the kind of target detected. For example, the locator system may automatically switch to sonde mode if a 512 Hz frequency is detected while tracing at some line frequency (e.g., 33 kHz) and while simultaneously seeking passive signals in a broad band region such as >10 kHz. The locator may permit the operator to "lock" to a frequency mode as an override of the automatic mode-change feature, thereby retaining control to focus on a particular frequency. Alternatively, the locator may display information related to several bands or frequencies with, for example, a line-trace frequency or sonde frequency locked to appear "uppermost" in a layered display image. In another aspect of this embodiment, sound signals may be used to signal an automatic mode-change to the operator, or to signal to the operator when new frequencies are detected during the search, for example. In another aspect of this embodiment, four channels of information from four different frequencies may be displayed simultaneously, such as a sonde frequency of 512 Hz, a passive AC power frequency, a 33 kHz line-trace frequency, and detections in a passive >10 kHz band, for example.

Figure 11A:
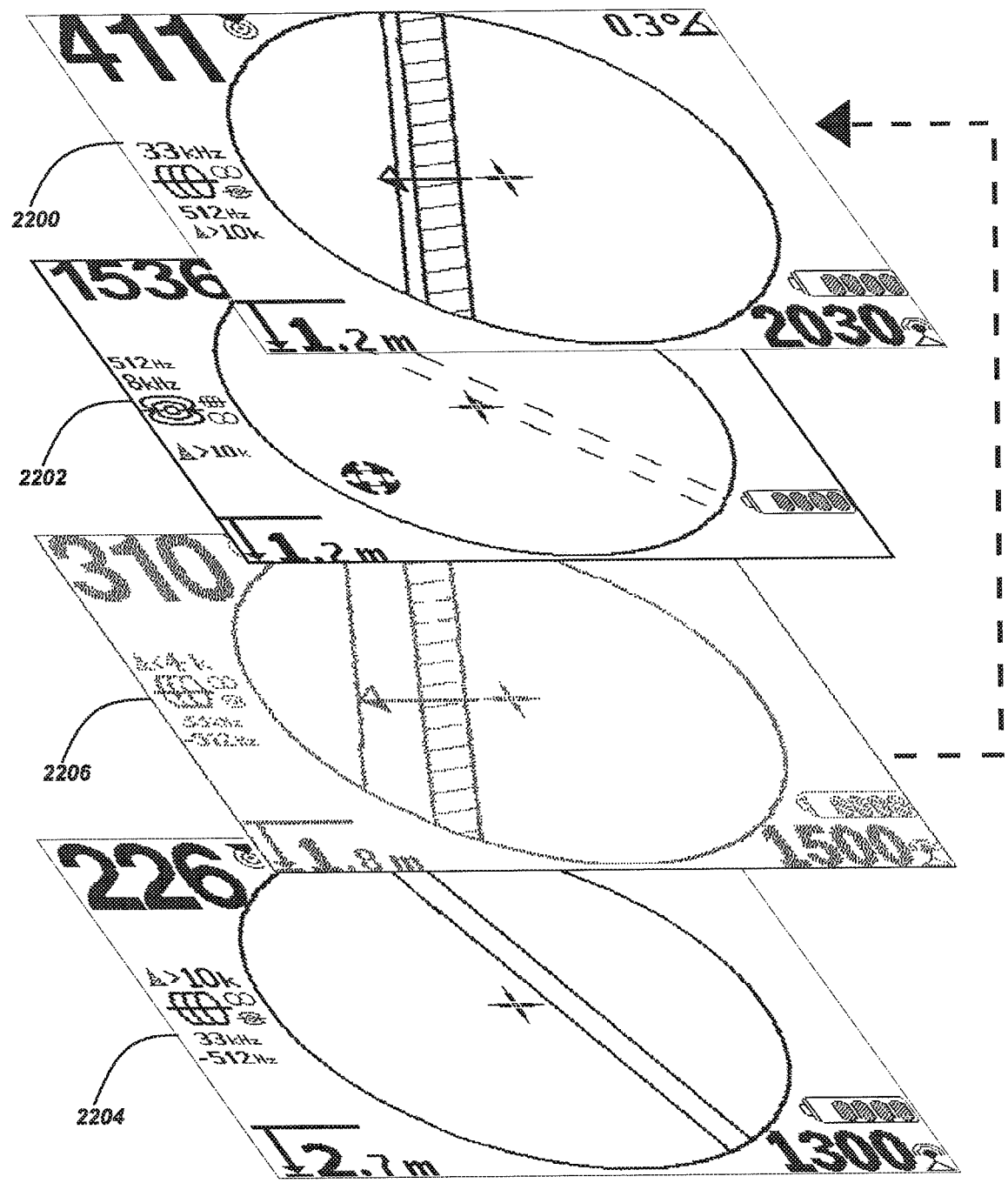
FIG. 11A is schematic diagram illustrating an exemplary GUI layered display of target location information at multiple frequencies.
Figure 11B:
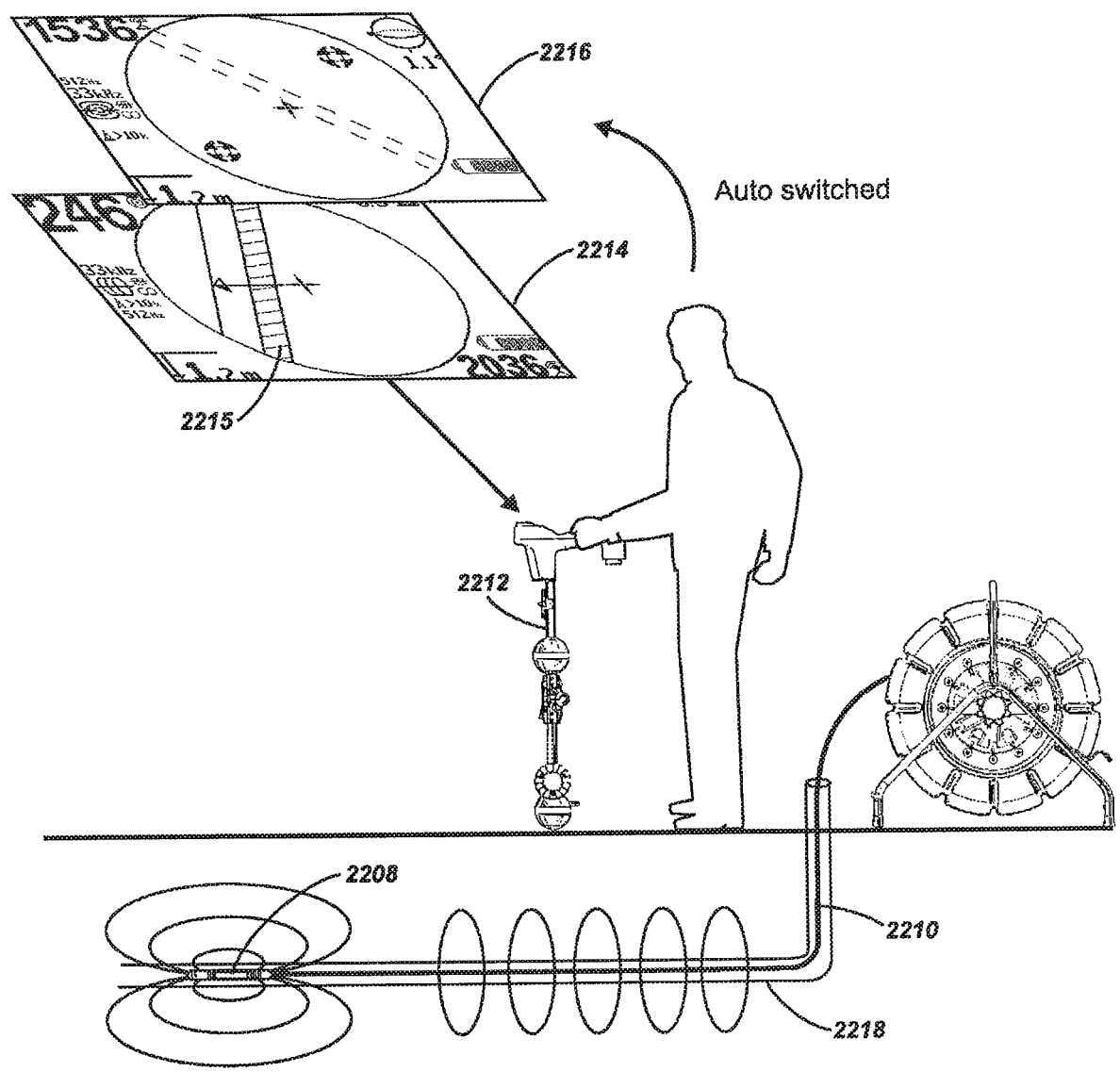
FIG. 11B is a schematic diagram illustrating the tracing at 33 kHz of a push cable coupled to a 512 Hz sonde at its far end and an exemplary GUI layered display with auto-switched images illustrative of an exemplary automatic sonde detection procedure of this invention.

FIGS. 11A and 11B illustrate an exemplary embodiment suitable for use with these aspects. FIG. 11A shows an embodiment of the layered display method of this invention suitable for use when simultaneously tracing several frequencies. A selected primary frequency (such as a 512 Hz sonde detection) image layer 2202 is moved up in the display stack above the displays of other frequencies. Using the above-described signal filtering method, the locator system display may automatically switch to the sonde mode and display image layer 2202 automatically pushed to the top of the display image stack responsive to the detection (above a user-adjustable threshold) of any 512 Hz signal, for example. Alternatively, when a 33 kHz signal is detected in the absence of a 512 Hz sonde signal, then the 33 kHz display image 2200 is of primary interest and its display image 2200 may be pushed to the top of the display image stack. The locator system may also be scanning simultaneously for passive signals in the <4 kHz power band, for example, applying a notch filter to eliminate all 512 Hz signals from the <4 kHz power band display image layer 2206, and may also be scanning for passive signals in the >10 kHz band, for example, applying a notch filter to remove any 33 kHz frequencies from the >10 kHz band display image layer 2204. In such configurations, an inserted cable energized at 33 kHz and having a sonde and camera at the end may be traced, while also continuously scanning for the 512 Hz sonde itself as it moves into detection range, while also searching for other frequencies in the two <4 kHz and >10 kHz passive-search bands, for example. The system may also provide means for an operator selectable "lock" on a particular frequency of interest to hold the corresponding display image at the top layer of the GUI stack to facilitate concentration on a particular target by the locator operator while also updating other target frequencies at lower display layers without regard to their proximity, for example. The frequencies filtered out in a particular display may be indicated to the operator by, for example, displaying their numerical values prefixed by a minus ("−") sign to remind the operator that they have been filtered from the display image. Display image stack layers may be ordered by, for example, proximity, signal strength, by cyclic or manual rotation, or any other useful criterion.

FIG. 11B is a schematic diagram illustrating the tracing at 33 kHz of a sewer snake 2210 (energized using 33 kHz or other traceable frequency) coupled to a 512 Hz sonde 2208 (powered by wires within sewer snake 2210) at its far end, and an exemplary GUI layered display with auto-switched images 2214 and 2216 illustrative of an exemplary automatic sonde detection procedure mentioned above. Such a scenario may be encountered, for example, when seeking the location of a blockage in a domestic drain line 2218. In the scenario of FIG. 11B, the locator system 2212 includes a first bandpass filter (not shown) configured to a predetermined sonde frequency (e.g., 512 Hz), a second bandpass filter (not shown) configured to a predetermined line frequency (e.g., 33 kHz), and a third broadband filter (not shown) configured for known line-tracing frequencies. Locator system 2212 also includes GUI processing means for displaying images indicating the detection of one or more of (a) a known-frequency target sonde, (b) a known-frequency line such as might be built into the cable connected to the sonde, and (c) other hidden lines which may be encountered. The display image 2214 is illustrated as displaying a trace line 2215 at 33 kHz, and the display image 2216 indicates the detection of sonde 2208, whereby the system advances image 2216 to the top layer of the layered GUI image stack.

In another aspect of the preferred system embodiment of this invention, the GUI tracing line display image is produced to vary in width inversely (or as a generally monotonic function of the inverse) to the depth computed for a detected conductor or buried object. Alternatively, the GUI tracing line display image is produced to vary in width inversely (or as a generally monotonic function of the inverse) to the proximity computed for the detected object or conductor. Thus, for example, a buried cable detection produces a display image having a wider tracing line when closer to the locator and a narrower tracing line when further away (using the alternative proximity proportionality). Of course, any other useful image characteristics may alternatively be used to indicate relative calculated depth or proximity, such as color density, graphic patterns, and the like.

Figure 12A:
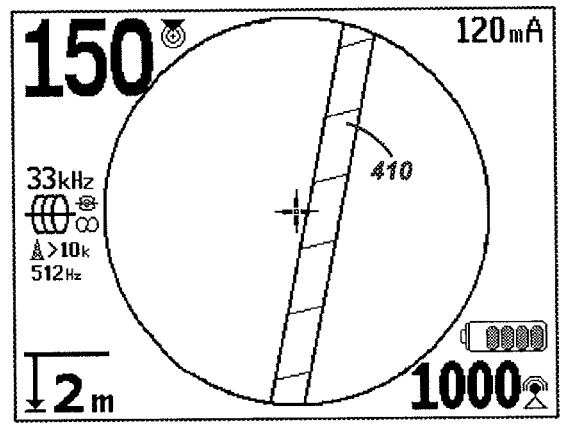
FIGS. 12A, 12B and 12C are schematic diagrams illustrating the evolution of an exemplary GUI display using a change in trace line width to represent locator movement toward a target 33 kHz conductor.
Figure 12B:
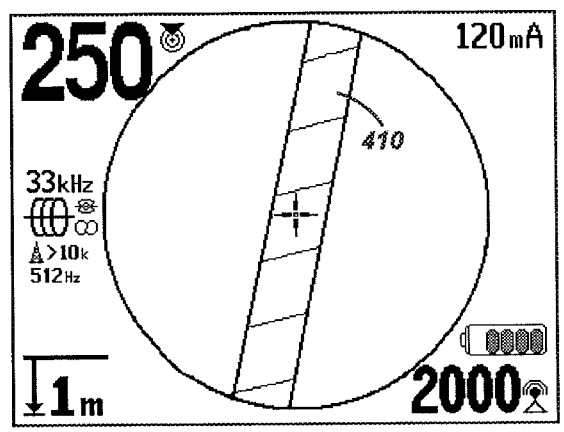
Figure 12C:
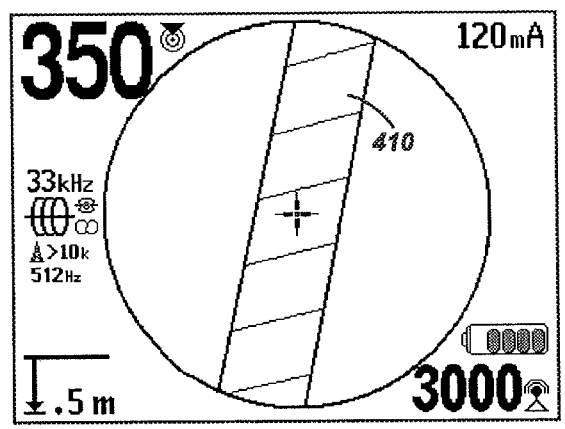

FIGS. 12A, 12B and 12C are schematic diagrams illustrating the evolution of an exemplary GUI display image using a change in trace line width to represent locator movement toward a conductor target radiating at 33 kHz. In FIG. 12A, the trace line 410 is displayed as relatively narrow to indicate a depth of 6 feet (1.8 m). In FIG. 12B, the calculated depth has dropped to 4 feet (1.2 m), and trace line 410 is displayed as wider line. In FIG. 12C, the locator has moved to within 2 feet (0.6 m) of the target conductor, and trace line 410 is displayed as a yet wider line. This UI display image method provides a rapid and intuitive visual cue to the operator of relative locator movement with respect to the detected target. Other useful techniques may also be used with the system of this invention, such as variable-density cross hatching or color-coding, for example. In another aspect of a preferred embodiment described above, the gradient coils of the locator are used in conjunction with the lower antenna array signals to provide a basis for the computation of proximity and depth of a detected buried utility.

In another aspect of the system of this invention, signals from the two gradient coil antennas 1218 and 1220 (FIG. 7D) located on either side of the locator shaft are used to compute alignment information relative to the detected conductor. Detection information from these gradient coils alone is sufficient to determine the lateral disposition of a guidance line on a GUI display image, while the primary trace line disposition on the display image requires the full vector information supplied by the upper and lower 3D omnidirectional antennas.

Figure 13A:
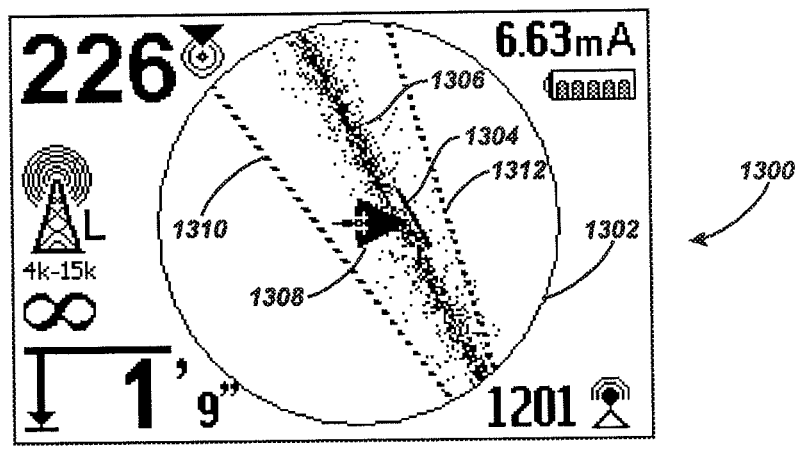
FIGS. 13A, 13B and 13C are schematic diagrams each illustrating an exemplary GUI display using a centering pair of arrows, a tracing line and a gradient guidance line in combinations representing a multi-dimensional view of a locating situation in real time.
Figure 13B:
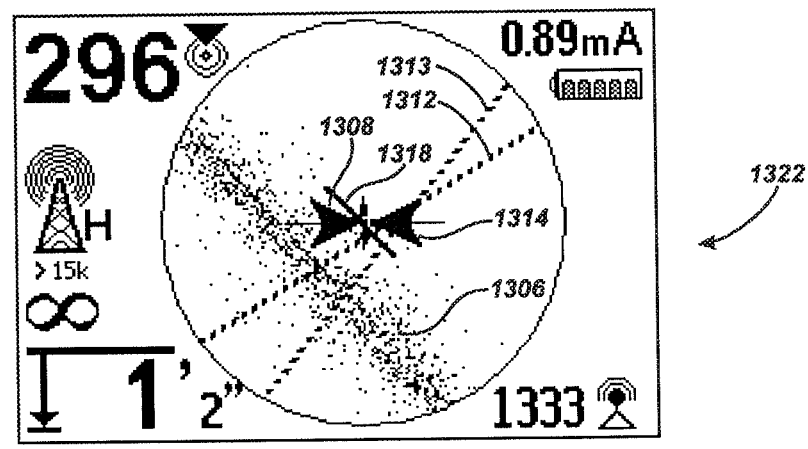
Figure 13C:
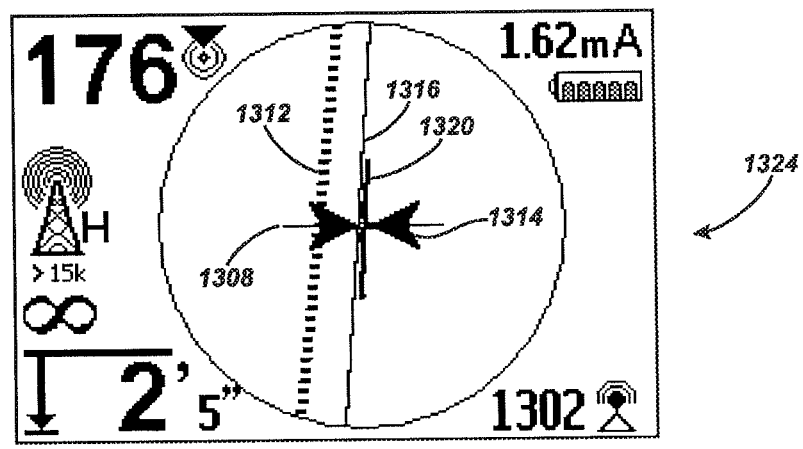

FIGS. 13A, 13B and 13C are schematic diagrams each illustrating an exemplary GUI display image using a centering pair of arrows, a tracing line and a gradient guidance line in combinations representing a multi-dimensional view of a locating situation in real time. In FIG. 13A, a locator display image 1300 is shown presenting a central circular area 1302 in which the multiple frequency bands sensed by the locator are simultaneously displayed graphically as lines 1306, 1310, and 1312. Using computational methods discussed above, the primary trace line 1306 is disposed to represent a bearing calculated for a signal emission detected in the frequency band containing the signal having the nearest calculated proximity, the 4 k-15 kHz band in this example. A guidance arrow 1308 is displayed to indicate the direction of lateral locator movement required to better align the locator with the source of primary tracing line 1306, and a guidance line 1304 indicates the target bearing by its displayed angle. Guidance line 1304 also indicates by its relative length the degree of alignment with the source of primary tracing line 1306, growing longer to indicate the approach of locator alignment to that of the source of primary tracing line 1306. Primary tracing line 1306 also indicates the computed level of signal distortion by adding a visual "fuzzing" or defocusing effect to graphic line 1306, which quickly and intuitively communicates a qualitative sense of signal conditions in the local area and thereby a qualitative sense of target detection reliability. Thus, in a region with little or no signal distortion, primary tracing line 1306 is presented as a clean straight line. With increasing signal distortion, primary tracing line 1306 is presented with correspondingly increased "fuzziness." The two secondary trace lines 1310 and 1312 represent signal detections in two other bands (e.g., <4 kHz and >15 kHz).

In FIG. 13B, primary tracing line 1306 represents a detection in the >15 kHz band and the secondary tracing lines 1312 and 1313 represent detections in other bands such as 4-15 kHz and <4 kHz, for example. The two guidance arrows 1308 and 1314 are centered on the guidance line 1318 in FIG. 13B to indicate that the locator is disposed directly over the primary conductor detected in the >15 kHz band. The display image 1322 shows that significant signal distortion is present by the degree of "fuzziness" in primary tracing line 1306 and by the lateral displacement between primary tracing line 1306 and guidance line 1308.

In FIG. 13C, a display image 1324 shows an undistorted primary tracing line 1316 well-aligned with the guidance line 1320 bearing. Guidance arrows 1308 and 1314 indicate that the locator is disposed directly over the primary detected conductor. Primary trace line 1316 indicates a relatively undistorted detection in the >15 kHz band. A secondary trace line 1312 indicates a simultaneous detection in another band (e.g., <4 kHz or 4-15 kHz). Guidance line 1320 is displayed at or near maximum length to indicate that it is closely aligned with conductor represented by primary trace line 1316. There is little or no lateral displacement between guidance line 1320 and primary tracing line 1316, and guidance arrows 1308 and 1314 indicate centering over the primary conductor emitting in the >15 kHz band.

In another aspect of the system of this invention, a process for smoothing filter bandwidth variations and for simultaneously improving the inverse-frequency (1/f) noise characteristics of the analog-digital conversion process is embodied as a method including the step of varying the clocking rate of the analog to digital converter (ADC). The clock-rate varying step may be performed stepwise or continuously. In one embodiment of this process, the clock rate is adjusted to optimize the calculated proximity of a given signal. The inventors have discovered that optimizing the ADC clock rate in this manner provides a more stable detection signal for passive locating. In particular, for lower frequencies, smoothly and adaptively reducing the ADC clocking rate should yield gradually slower response times but with gradually narrower filter widths, and hence improved SNR, which is of particular value in a noisy environment.

Figure 14A:
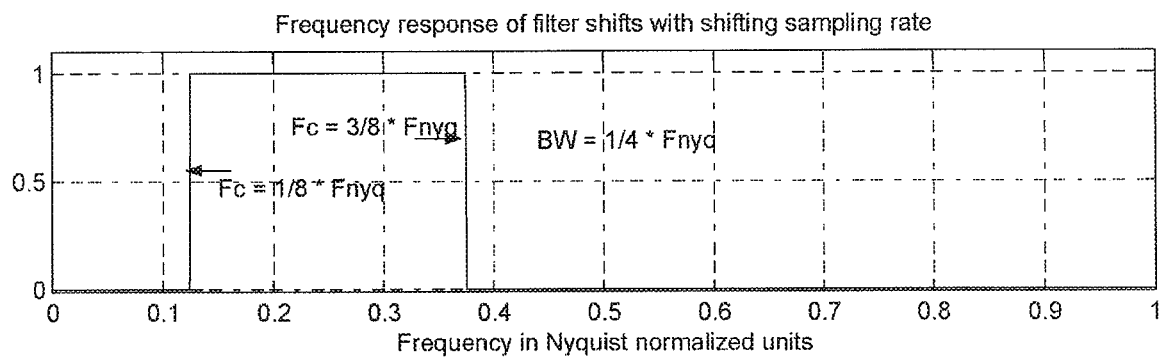
FIGS. 14A, 14B and 14C are graphs illustrating the effects of shifting the analog to digital converter (ADC) clocking rate to optimize noise characteristics and smooth filter bandwidth.
Figure 14B:
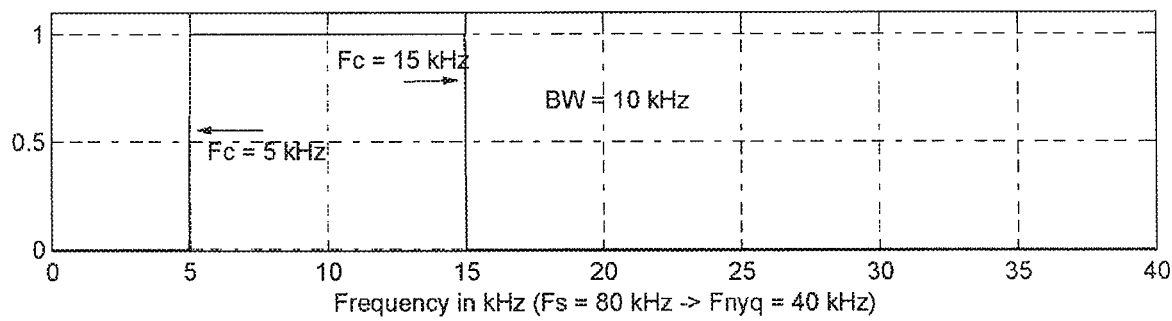
Figure 14C:
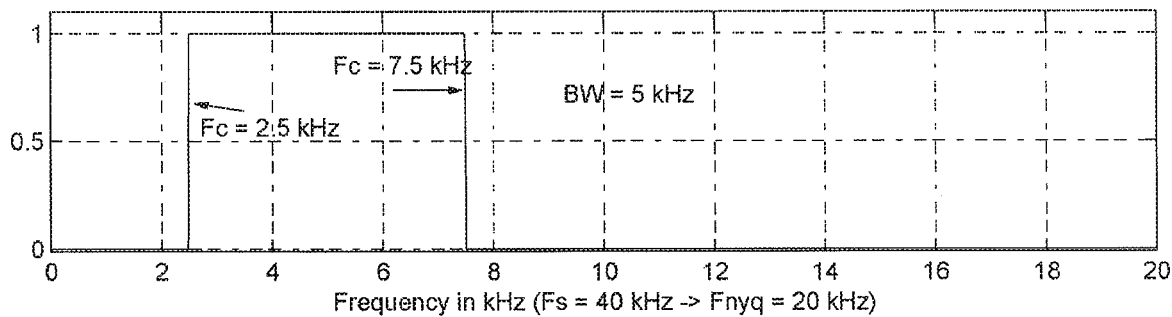

In FIGS. 14A, 14B and 14C, this ADC clock rate adjustment method is illustrated graphically. In FIG. 14A, the filter frequency responses are normalized to a fraction of the Nyquist rate (determined by the ADC sampling clock rate). FIGS. 14B and 14C show the filter frequency responses for two different Nyquist rates. FIG. 14B shows a filter frequency response with a bandwidth of 10 kHz for a Nyquist value of 40 kHz, and FIG. 14C shows a filter frequency response with a bandwidth of 5 kHz for a Nyquist value of 20 kHz.

Clearly, other embodiments and modifications of this invention may occur readily to those of ordinary skill in the art in view of these teachings. Therefore, this invention is to be limited only by the following claims and their equivalents, which include all such embodiments and modifications when viewed in conjunction with the above specification and accompanying drawings.

We claim:

1. A buried utility locator device, comprising:
   a magnetic field antenna array for simultaneously detecting magnetic field signals emitted from a first buried utility and a second, separate, buried utility and providing corresponding output signals;
   an electronic circuit operatively coupled to the magnetic field antenna array for receiving and processing the magnetic field antenna array output signals and simultaneously generating output signals associated with each of the first buried utility and the second buried utility;
   a processor for receiving the output signals and determining information associated with the first and second buried utilities based at least in part on the processed magnetic field antenna output signals; and
   a non-transitory memory for storing the determined information.

2. The locator device of claim 1, further including a display for providing a visual output of the determined information associated with the buried objects simultaneously.

3. The locator device of claim 2, wherein the display comprises an LCD or LED panel display.

4. The locator device of claim 1, further including an enclosure for housing an electrical circuit, wherein the enclosure has separate gradient coils disposed on opposite sides of the enclosure for detecting a magnetic field gradient between the coils, wherein detecting the magnetic field gradient between the coils comprises determining the difference between the magnetic field gradient detected at each of the separate gradient coils.

5. The locator device of claim 4, wherein the gradient coils of the locator are used in conjunction with the antenna array signals to provide a basis for computing a proximity and depth of a detected buried utility.

6. The locator device of claim 1, wherein processing the magnetic field antenna array output signals further includes determining signal quality, wherein signal quality includes signal strength and reliability.

7. The locator device of claim 6, further including an adjustable variable-time bandpass filter coupled to the output signals to provide adjustment of a filter time-constant responsive to the determined signal quality.

8. A method for locating a buried utility, comprising:
   detecting magnetic field signals emitted from a first buried utility and simultaneously detecting magnetic field signals from a second separate buried utility using a magnetic field antenna array;
   providing corresponding output signals from the detected first and second buried utility signals;
   receiving and processing the magnetic field antenna array output signals and simultaneously generating output signals associated with each of the first buried utility and the second buried utility using an electronic circuit operatively coupled to the magnetic field antenna array;
   receiving the output signals and determining information associated with the first and second buried utilities based at least in part on the processed magnetic field antenna output signals using an electronic circuit including a processor; and
   storing the determined information using a non-transitory memory.

9. The method of claim 8, further including providing to a display a visual output of the determined information associated with the buried objects simultaneously.

10. The method of claim 8, wherein the display comprises an LCD or LED panel display.

11. The method of claim 8, further including detecting a magnetic field gradient between the coils using separate gradient coils, wherein detecting the magnetic field gradient between the coils comprises determining the difference between the magnetic field gradient detected at each of the separate gradient coils.

12. The method of claim 8, computing a proximity and depth of a detected buried utility.

13. The method of claim 8, filtering the output signals to provide adjustment of a filter time-constant responsive to the determined signal quality, wherein signal quality includes signal strength and reliability.

14. A buried utility locator device, comprising:
- a magnetic field antenna array for simultaneously detecting magnetic field signals emitted from a first buried utility and a second, separate, buried utility and providing corresponding output signals;
- an electronic circuit operatively coupled to the magnetic field antenna array for receiving and processing the magnetic field antenna array output signals and simultaneously generating output signals associated with each of the first buried utility and the second buried utility;
- a processor for receiving the output signals and determining information associated with the first and second buried utilities based at least in part on the processed magnetic field antenna output signals;
- a non-transitory memory for storing the determined information;
- a display for providing a visual output of the determined information associated with the buried objects simultaneously, wherein the display comprises an LCD or LED panel display; and
- an enclosure for housing an electrical circuit, wherein the enclosure has separate gradient coils disposed on opposite sides of the enclosure for detecting a magnetic field gradient between the coils, wherein detecting the magnetic field gradient between the coils comprises determining the difference between the magnetic field gradient detected at each of the separate gradient coils, wherein the gradient coils of the locator are used in conjunction with the antenna array signals to provide a basis for computing a proximity and depth of a detected buried utility.

15. The locator device of claim 14, wherein processing the magnetic field antenna array output signals further includes determining signal quality, wherein signal quality includes signal strength and reliability; and further including an adjustable variable-time bandpass filter coupled to the output signals to provide adjustment of a filter time-constant responsive to the determined signal quality.

16. A method for locating a buried utility, comprising:
- detecting magnetic field signals emitted from a first buried utility and simultaneously detecting magnetic field signals from a second separate buried utility using a magnetic field antenna array;
- providing corresponding output signals from the detected first and second buried utility signals;
- receiving and processing the magnetic field antenna array output signals and simultaneously generating output signals associated with each of the first buried utility and the second buried utility using an electronic circuit operatively coupled to the magnetic field antenna array;
- receiving the output signals and determining information associated with the first and second buried utilities based at least in part on the processed magnetic field antenna output signals using an electronic circuit including a processor;
- storing the determined information using a non-transitory memory;
- providing to a display a visual output of the determined information associated with the buried objects simultaneously, wherein the display comprises an LCD or LED panel display;
- detecting a magnetic field gradient between the coils using separate gradient coils, wherein detecting the magnetic field gradient between the coils comprises determining the difference between the magnetic field gradient detected at each of the separate gradient coils;
- computing a proximity and depth of a detected buried utility; and
- filtering the output signals to provide adjustment of a filter time-constant responsive to the determined signal quality, wherein signal quality includes signal strength and reliability.

* * * * *